US008799210B2

(12) United States Patent
Paliwal et al.

(10) Patent No.: US 8,799,210 B2
(45) Date of Patent: Aug. 5, 2014

(54) FRAMEWORK FOR SUPPORTING TRANSITION OF ONE OR MORE APPLICATIONS OF AN ORGANIZATION

(75) Inventors: Virendra Paliwal, Bangalore (IN); Savio D'Souza, Bangalore (IN); Dinesh Kumara Shetty, Bangalore (IN); Venkatakrishnan Balasubramanian, Trichy (IN); Lakshmi Narasimhan Narayanan, Chennai (IN)

(73) Assignee: Infosys Limited (IN)

( * ) Notice: Subject to any disclaimer, the term of this patent is extended or adjusted under 35 U.S.C. 154(b) by 727 days.

(21) Appl. No.: 12/362,578

(22) Filed: Jan. 30, 2009

(65) Prior Publication Data
US 2009/0288018 A1 Nov. 19, 2009

(30) Foreign Application Priority Data
Feb. 1, 2008 (IN) .............................. 272/CHE/2008

(51) Int. Cl.
*G06F 17/00* (2006.01)
*G06F 7/00* (2006.01)
(52) U.S. Cl.
USPC ........................................... 707/608; 706/60
(58) Field of Classification Search
USPC ............................................ 707/608; 706/60
See application file for complete search history.

(56) References Cited

U.S. PATENT DOCUMENTS

| 6,288,753 | B1 * | 9/2001 | DeNicola et al. ............. 348/586 |
| 6,301,462 | B1 * | 10/2001 | Freeman et al. ............. 434/350 |
| 6,421,678 | B2 * | 7/2002 | Smiga et al. .................. 707/608 |
| 6,471,521 | B1 * | 10/2002 | Dornbush et al. ............. 434/322 |
| 6,581,039 | B2 * | 6/2003 | Marpe et al. ...................... 705/7 |
| 6,587,668 | B1 * | 7/2003 | Miller et al. .................. 434/350 |
| 6,601,233 | B1 * | 7/2003 | Underwood .................. 717/102 |
| 6,615,199 | B1 * | 9/2003 | Bowman-Amuah ............ 706/50 |
| 6,735,596 | B2 * | 5/2004 | Corynen ................ 707/999.101 |
| 6,738,746 | B1 * | 5/2004 | Barnard et al. .............. 705/7.17 |
| 6,895,382 | B1 * | 5/2005 | Srinivasan et al. ................ 705/7 |
| 7,149,698 | B2 * | 12/2006 | Guheen et al. ................ 705/319 |
| 7,162,427 | B1 * | 1/2007 | Myrick et al. ................ 705/348 |
| 7,181,493 | B2 * | 2/2007 | English et al. ................ 709/204 |
| 7,321,886 | B2 * | 1/2008 | Swaminathan et al. ........ 706/60 |
| 7,392,232 | B1 * | 6/2008 | Wizdo et al. .................... 706/45 |

(Continued)

OTHER PUBLICATIONS

Beulen, E., Tiwari, V., & Heck, E. v. (2011). Understanding transition performance during offshore IT outsourcing. Strategic Outsourcing: An International Journal, 4(3), 204-227.

(Continued)

*Primary Examiner* — Pavan Mamillapalli
(74) *Attorney, Agent, or Firm* — Lerner, David, Littenberg, Krumholz & Mentlik, LLP

(57) ABSTRACT

A framework for supporting transition of one or more applications of an organization is provided. The one or more applications are transitioned from a first set of users to a second set of users. The framework includes a transition module, a knowledge capture module, a knowledge validation module, and a collaboration module. The transition module generates one or more transition plans based on information corresponding to the one or more applications. The knowledge capture module captures a plurality of knowledge elements corresponding to the one or more applications. The knowledge capture module further establishes association between the plurality of knowledge elements. The knowledge validation module validates the plurality of knowledge elements and their association. The collaboration module provides collaboration between the first set of users and the second set of users during the transition of the one or more applications.

46 Claims, 9 Drawing Sheets

(56) References Cited

U.S. PATENT DOCUMENTS

| | | | |
|---|---|---|---|
| 7,398,222 B2* | 7/2008 | Barnard et al. | 705/7.13 |
| 7,409,686 B2* | 8/2008 | Yamada et al. | 718/102 |
| 7,548,872 B2* | 6/2009 | Keay et al. | 705/7.25 |
| 7,698,316 B2* | 4/2010 | Song et al. | 707/608 |
| 7,747,572 B2* | 6/2010 | Scott et al. | 707/636 |
| 7,757,234 B2* | 7/2010 | Krebs | 718/101 |
| 7,792,694 B2* | 9/2010 | Jamil et al. | 705/10 |
| 7,809,671 B2* | 10/2010 | Swaminathan et al. | 706/60 |
| 8,290,803 B2 | 10/2012 | Barrett et al. | |
| 2002/0152187 A1* | 10/2002 | Chien | 706/60 |
| 2003/0163357 A1* | 8/2003 | Engleman et al. | 705/7 |
| 2003/0219710 A1* | 11/2003 | Suiter et al. | 434/350 |
| 2004/0095378 A1* | 5/2004 | Vigue et al. | 345/723 |
| 2004/0143470 A1* | 7/2004 | Myrick et al. | 705/7 |
| 2004/0225549 A1* | 11/2004 | Parker et al. | 705/8 |
| 2005/0027696 A1* | 2/2005 | Swaminathan et al. | 707/3 |
| 2005/0065831 A1* | 3/2005 | Keay et al. | 705/8 |
| 2006/0004596 A1* | 1/2006 | Caniglia et al. | 705/1 |
| 2006/0089861 A1* | 4/2006 | King et al. | 705/4 |
| 2006/0095309 A1 | 5/2006 | Mangan et al. | |
| 2006/0195373 A1 | 8/2006 | Flaxer et al. | |
| 2006/0200474 A1* | 9/2006 | Snyder et al. | 707/100 |
| 2006/0240396 A1* | 10/2006 | Foo et al. | 434/350 |
| 2006/0277084 A1* | 12/2006 | Barnard et al. | 705/7 |
| 2007/0162321 A1* | 7/2007 | Behrmann et al. | 705/9 |
| 2007/0256058 A1* | 11/2007 | Marfatia et al. | 717/137 |
| 2008/0086354 A1* | 4/2008 | Nagar | 705/9 |
| 2008/0215683 A1* | 9/2008 | Swaminathan et al. | 709/205 |
| 2011/0022436 A1* | 1/2011 | Swaminathan et al. | 705/7 |

OTHER PUBLICATIONS

Clark, J. (1998). Outsourcing IT. Manufacturing Systems, 16(9), 22.

* cited by examiner

FRAMEWORK FOR SUPPORTING TRANSITION OF ONE OR MORE APPLICATIONS OF AN ORGANIZATION

BACKGROUND OF THE INVENTION

The invention relates generally to the field of outsourcing or offshoring of one or more applications of an organization. More specifically, the invention relates to a framework for supporting transition of the one or more applications from a first set of users to a second set of users.

The transition of applications involves transfer of management, support and execution of an entire business function supported by the applications to an external service provider. Applications that are transferred to the external service provider (or vendor) may include, software or Information Technology (IT) applications; applications supporting Information Technology Enabled Services (ITES), and business processes supporting at least one business function; and the like. A transfer agreement defining the transferred services is signed between the client and the supplier (or the external service provider). The transferred services include knowledge transition, and transfer of people, assets and other resources from the client. Knowledge transition includes due diligence, transition planning, monitoring, reporting, and knowledge transfer from incumbent resources to a vendor team, along with secondary and primary support and knowledge transfer to an offshore team. Due diligence involves obtaining a snapshot of the current portfolio (or the set of applications being transferred) and analyzing data collected for the portfolio. Transition planning is performed by a transition manager who also monitors and tracks data obtained from one or more transition team members, forming a part of the second set of users. Reports are collated and circulated to stakeholders or the client. Furthermore, knowledge transfer involves transfer of knowledge from a first set of users, such as incumbent resources, to a second set of users, such as vendor resources. In the first phase of knowledge transfer, the users from the vendor organization (offshore location) visit the client's location to interact with the Subject Matter Experts (SMEs). In the second phase, the second set of users returns to the offshore location to transfer the knowledge to the offshore team.

However, the current transition techniques are executed manually and most of the processes are executed on the client's location, thereby resulting in slow knowledge transfer to the offshore team. Also, a significant amount of resources needs to be present at the client's location, which increases transition costs and needs visa-ready resources in case of overseas travel. Further, the transition manager needs to formulate a detailed plan, which increases management overheads. In addition, collating information from numerous project plans for large transitions may not be accurate and meaningful insights may not be obtained from such plans. Also, it may be difficult for the transition manager to coordinate multiple execution tracks, such as infrastructure tracks, human resources tracks, and logistics tracks. Furthermore, the process of knowledge gathering is interaction intensive, depending on the interactions between the client SMEs, the onsite team, and the offsite (or offshore) team. It increases the possibility of knowledge leaks, knowledge loss, and inefficiencies in knowledge transfer, long transition periods, and high risks. Further, the knowledge is captured manually in various formats since it is not captured using knowledge capturing tools known in the art. Therefore, the knowledge capture and knowledge transfer phase is highly dependent on people, and is poorly scalable. Also, the current transition techniques have no or minimal client involvement in the various phases of transition, thereby resulting in zero or minimal transparency for the client. Moreover, the analysis of the applications is performed manually. The analysis process becomes tedious and laborious with an increase in the number of applications in the portfolio.

In light of the foregoing, there is a need for a framework which enables accelerated transition through collaboration between various participants of the transition and also reduces the cost and increases transparency during the transition process. The framework should use advanced knowledge management practices and should provide a centralized repository for sharing the captured knowledge.

BRIEF SUMMARY OF THE INVENTION

An object of the invention is to provide a framework for supporting transition of one or more applications of an organization.

Another object of the invention is to facilitate collaboration between users participating in the transition of the applications.

To achieve the objectives mentioned above, the invention provides a framework for supporting transition of the one or more applications of the organization. The applications are transitioned from a first set of users to a second set of users. The framework includes a transition module, a knowledge capture module, a knowledge validation module, and a collaboration module. The transition module generates one or more transition plans for the one or more applications. The transition plans are generated based on information corresponding to the one or more applications. The knowledge capture module captures a plurality of knowledge elements corresponding to the one or more applications. The knowledge elements are captured using at least one of one or more knowledge capturing tools and one or more predefined knowledge reference components. The knowledge capture module further establishes an association between the plurality of knowledge elements. The knowledge validation module validates the plurality of knowledge elements and the association between the plurality of knowledge elements. The collaboration module facilitates collaboration between the first set of users and the second set of users during the transition of the one or more applications.

The framework described above has a number of advantages. The framework facilitates collaboration between the users involved in the transition process, thereby enabling easy management of the transition process involving a large number of users. Further, the framework improves transparency, and simplifies and automates the transition process. It also overcomes the problems of making the transition offshore centric and reduces the cost of transition and visa requirements significantly. The framework eliminates the need for the presence of a significant number of resources at the client's location(s) and enables transition to be performed at a global platform.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DETAILED DESCRIPTION

The invention describes a framework, method, and computer program product for supporting transition of one or more applications of an organization. The transition of the applications includes service transfer of maintenance and support of the applications, along with knowledge or information associated with the applications. The applications are transitioned from a first set of users to a second set of users. One or more transition plans are generated for each of the one or more applications. The transition plans are generated based on information corresponding to the one or more applications. Each of the one or more transition plans includes one or more transition activities. Further, a plurality of knowledge elements corresponding to the one or more applications and the one or more transition activities is captured. The plurality of knowledge elements is captured using at least one of one or more knowledge capturing tools and one or more predefined knowledge reference components. The plurality of knowledge elements are then associated with each other. Furthermore, the knowledge elements and their association are validated on the basis of a predefined set of rules. Collaboration is provided or established between the first set of users and the second set of users to enable communication between them.

Figure 1:
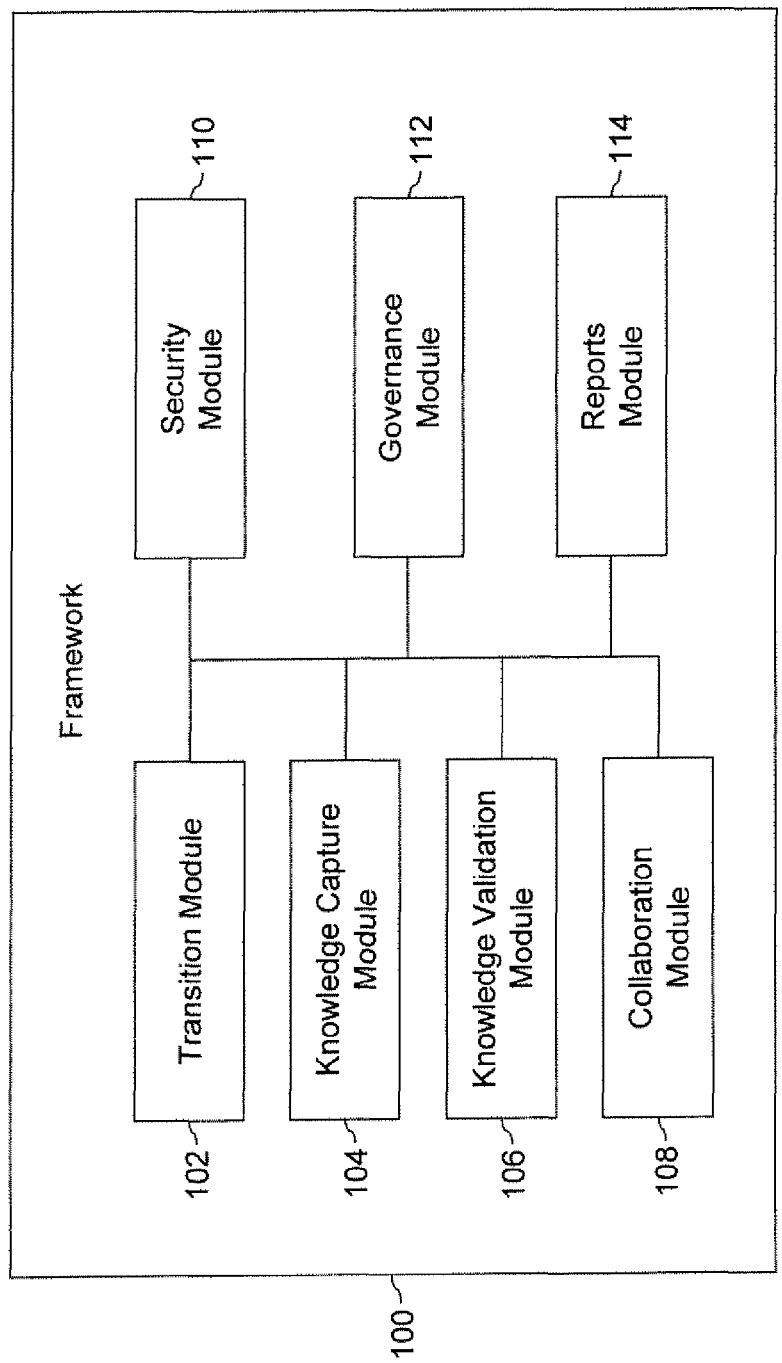
FIG. 1 is a block diagram of a framework for supporting transition of one or more applications of an organization, in accordance with an embodiment of the invention.

FIG. 1 is a block diagram of a framework 100 for supporting transition of one or more applications of an organization, in accordance with an embodiment of the invention. Framework 100 includes a transition module 102, a knowledge capture module 104, a knowledge validation module 106, a collaboration module 108, a security module 110, a governance module 112, and a reports module 114.

An organization uses several applications for supporting its various functions or business needs, for example, Information Technology (IT), operations, infrastructure, Human Resources (HR), and so forth. Furthermore, there are various applications that are managed, supported or maintained by the organization. For example, the organization manages various applications for providing support to a different organization. In various embodiments of the invention, framework 100 enables a user to support and manage transition of one or more applications of the organization. The applications are transitioned by the organization such that the applications are supported from the same and/or a different location and by a different set of users of the same and/or a different organization.

Transition module 102 generates one or more transition plans for the one or more applications of the organization. The transition plans are generated based on information corresponding to the one or more applications. The information corresponding to the applications includes information describing the applications for example, business domain of the application, complexity, criticality and stability of the applications, and so forth. The information corresponding to the applications also includes information describing the environment in which the application is implemented, for example, programming language of the application, security compliance, and so forth. In an embodiment of the invention, the transition plans are generated by a user, for example, a transition manager. The generation of the transition plans is explained in conjunction with FIG. 2.

Each of the one or more transition plans includes one or more transition activities. The transition activities refer to the activities or tasks that need to be performed during the transition process. The transition activities include, transition kick off, review of overall transition plan, and so forth. In other words, the transition activities refer to the activities that need to be performed during different phases of the transition process, for example, due diligence, transition planning, monitoring, reporting, knowledge transfer, secondary support, primary support, and transition closure.

Transition module 102 enables planning and tracking of the one or more transition activities. Further, transition module 102 provides a de-risked approach with related toll gate checks to be completed after each phase of the transition process. Transition module 102 is described in detail in conjunction with FIG. 2.

Knowledge capture module 104 captures a plurality of knowledge elements corresponding to the one or more applications. Knowledge elements include business, system and testing knowledge related to the applications. Examples of some of the knowledge elements captured by knowledge capture module 104 include program elements or source code, use-cases, test cases, support processes, incident resolutions, and so forth. Further, the knowledge elements also correspond to the one or more transition activities of the transition plans. For example, discussion with SMEs to gain overall business process knowledge; collection of incident data for last 12 months; discussion and study of available documentation such as requirement specifications, training material, user manual, administration manual; extraction of application information based on an application source code; and so forth are the transition activities using various knowledge elements such as training material, user manual, and the like. In other words, knowledge capture module 104 provides a controlled and centralized repository of documents used in the one or more transition activities.

The knowledge elements are captured using at least one of the one or more knowledge capturing tools and one or more predefined knowledge reference components. Knowledge capturing tools such as Influx® developed by Infosys®, Rational® TestManager developed by IBM®, Enterprise View™ developed by Micro Focus®, Intelligent Production Support Platform (IPSP) developed by Infosys®, Service Level Agreement developed by Oblicore™, and so forth are used for capturing the knowledge elements. Further, the predefined knowledge reference components include templates, forms, and so forth used for capturing the knowledge elements. In an embodiment of the invention, both the knowledge capturing tools and the predefined knowledge reference components are used for capturing the knowledge elements. Knowledge capture module 104 is described in detail in conjunction with FIG. 3. Knowledge capture module 104 captures the knowledge elements from a first set of users. The first set of users includes business users, Subject Matter Experts (SMEs), person(s) using and/or managing the applications in the organization, and so forth. The knowledge elements are captured from the first set of users and are then transferred to a second set of users. The second set of users includes person(s) belonging to the same or a different organization. Examples of the second set of users include external service providers or vendor resources, person(s) belonging to a different department or business unit of an organization, persons belonging to the same department or business unit of an organization but other than the first set of users, and so forth. In an embodiment of the invention, the second set of users also includes the transition manager.

Knowledge capture module 104 further associates the plurality of knowledge elements with each other. Each application has a plurality of knowledge elements corresponding to it. The knowledge elements corresponding to a particular application are associated with each other. The association of the plurality of knowledge elements is used for searching or identifying the knowledge elements corresponding to the application. For example, for a particular application, its source code, business process model or use-case, and the test cases are associated with each other. In an embodiment of the invention, each knowledge element is associated with one or more knowledge elements. It will be evident to a person skilled in the art that the knowledge elements can be associated with each other in a one-to-one, one-to-many and many-to-one correspondence. Further, the association of the plurality of knowledge elements is established by the first and the second set of users. The knowledge elements are captured from the first set of users and are transferred to the second set of users. The second set of users along with the first set of users establishes an association between the plurality of knowledge elements. The association of the plurality of knowledge elements is described in detail in conjunction with FIG. 3.

Knowledge validation module 106 validates the plurality of knowledge elements captured by knowledge capture module 104. Knowledge validation module 106 also validates the association between the plurality of knowledge elements. Knowledge validation module 106 validates the knowledge elements and their association on the basis of a predefined set of rules. Knowledge validation module 106 has various key features, for example, quizzes, self rating, client SME rating, and a scoring dashboard, for validating the knowledge elements. The predefined set of rules for validating the knowledge elements are based on the key features of knowledge validation module 106.

Knowledge validation module 106 provides a knowledge assessment framework for conducting one or more quizzes for the second set of users to assess or validate the captured knowledge elements and their associations. The quiz feature of knowledge validation module 106 assists the client SME(s) and the first set of users in building or generating a quiz or a set of questions on different topics related to the one or more applications. Knowledge validation module 106 sends a mail to the second set of users to participate in the quiz. In an embodiment of the invention, the first set of users can nominate or select one or more of the second set of users who need to participate in the quiz. Once each of the second set of users has responded to the quiz, scores of the quiz are generated. The scores are generated by knowledge validation module 106 based on the correct answers provided by the first set of users and the client SME(s). Therefore, the quiz feature assists the first set of users in validating the knowledge of the second set of users about the captured knowledge elements and their associations. In an embodiment of the invention, the scores of the quiz are generated and stored in a tabular form. Table 1 illustrates an exemplary score card of a quiz.

TABLE 1

Quiz Score Card

| Knowledge Areas | Weightage | Member-1 Quiz score (0-10) | Member-2 Quiz score (0-10) | Member-3 Quiz score (0-10) |
| --- | --- | --- | --- | --- |
| App Name1 | 50% | | | |
| Application Feature-1 | 20% | | | |
| Application Feature-2 | 20% | | | |
| Application Feature-3 | 10% | | | |
| Technical Knowledge | 20% | | | |
| Domain Knowledge | 30% | | | |
| App Name2 | 50% | | | |
| Application Feature-1 | 20% | | | |
| Application Feature-2 | 20% | | | |
| Application Feature-3 | 10% | | | |
| Technical Knowledge | 20% | | | |
| Domain Knowledge | 30% | | | |

Table 1 includes fields such as knowledge areas, weightage, and quiz scores of member 1, member 2 and member 3. Knowledge areas include different types of knowledge areas such as technical knowledge, domain knowledge, various features of the application, and so forth. Weightage describes the importance or relevance of a particular knowledge area in calculating the score of the quiz. For example, in table 1, the two applications, application 1 and application 2, have an equal weightage, i.e., 50%, and all knowledge areas for a particular application have a combined weightage of 100%. In other words, 50% weightage of application 1 is divided into different parts such as 20%, 10%, and so forth corresponding to the different knowledge areas. It will be evident to a person skilled in the art that different knowledge areas can have the same or a different weightage. Quiz scores of member 1, member 2, and member 3 represent the quiz scores of three members of the second set of users. It will be evident to a person skilled in the art that a quiz score card includes multiple fields to represent the quiz score depending on the number of members participating in the quiz. The quiz scores are provided on a scale of 0 to 10 based on the accuracy of the answers provided by the user. Further, the total score and average score of each application is calculated as follows:

Total score of each application=Weightage*Sum of quiz score of each member

Average score=Total score/Number of members

The average score of each application is used for validating the accuracy of the plurality of knowledge elements corresponding to the application that are captured and transferred to the second set of users. It also assists in validating the association between the plurality of knowledge elements.

The self rating feature of knowledge validation module 106 assists a user in rating his/her proficiency in different knowledge areas of an application. Each of the second set of users assesses his/her knowledge of the captured knowledge elements and their associations using the self rating feature. In an embodiment of the invention, the self rating provided by each of the second set of users is stored in a tabular form. Table 2 illustrates exemplary self ratings provided by different users.

TABLE 2

Self Rating Table

| Knowledge Areas | Weightage | Member-1 Self Rating Score (0-4) | Member-2 Self Rating Score (0-4) | Member-3 Self Rating Score (0-4) |
|---|---|---|---|---|
| App Name1 | 50% | | | |
| Application Feature-1 | 20% | | | |
| Application Feature-2 | 20% | | | |
| Application Feature-3 | 10% | | | |
| Technical Knowledge | 20% | | | |
| Domain Knowledge | 30% | | | |
| App Name2 | 50% | | | |
| Application Feature-1 | 20% | | | |
| Application Feature-2 | 20% | | | |
| Application Feature-3 | 10% | | | |
| Technical Knowledge | 20% | | | |
| Domain Knowledge | 30% | | | |

Table 2 includes fields such as knowledge areas, weightage, and self rating scores of member 1, member 2 and member 3. Knowledge areas include different types of knowledge areas such as functional knowledge, domain knowledge, various features of the application, and so forth. Weightage describes the importance or relevance of a particular knowledge area in calculating the self rating score. For example, in table 2, the two applications, application 1 and application 2, have an equal weightage, i.e., 50%, and all knowledge areas for a particular application have a combined weightage of 100%. In other words, 50% weightage of application 1 is divided into different parts such as 20%, 10%, and so forth corresponding to the different knowledge areas. It will be evident to a person skilled in the art that different knowledge areas can have the same or a different weightage. Self rating scores of member 1, member 2, and member 3 represent the self rating scores of three members of the second set of users. It will be evident to a person skilled in the art that a self rating table includes multiple fields to represent the self rating score depending on the number of members performing self rating. Also, knowledge validation module 106 does not display the self rating scores of a user to other members of the second set of users. However, the self rating scores of all members are displayed by knowledge validation module 106 to the first set of users and the client SME(s). The self rating scores are provided by a user on a scale of 0 to 4 based on his/her perception on the knowledge of the application. A score of 0 implies 'No knowledge at all', a score of 1 means 'Elementary theoretical knowledge', a score of 2 refers to 'Elementary hand on experience', a score of 3 means 'Comfortable with the system' and a score of 4 means 'Expert—can train others'. Further, the total score and average score of each application is calculated as follows:

Total score of each application=Weightage*Sum of self rating scores of each member.

Average score=Total score/Number of members

The average score of each application is used for validating the accuracy of the plurality of knowledge elements corresponding to the application that are captured and transferred to the second set of users. It also assists in validating the association between the plurality of knowledge elements.

The client SME rating feature of knowledge validation module 106 assists the client SME and the first set of users to rate proficiency of the second set of users in multiple knowledge areas of the application. The client SME assesses the knowledge of the captured knowledge elements and their associations using the client SME rating feature. The client SME rates the proficiency of all the second set of users in totality. In an embodiment of the invention, the combined or total rating provided by the client SME to each of the second set of users is stored in a tabular form. Table 3 illustrates exemplary ratings provided by the client SME.

TABLE 3

Client SME Rating table

| Knowledge Areas | Weightage | Client SME Rating Score (0-4) |
|---|---|---|
| App Name1 | 50% | |
| Application Feature-1 | 20% | |
| Application Feature-2 | 20% | |
| Application Feature-3 | 10% | |
| Domain Knowledge | 30% | |
| App Name2 | 50% | |
| Application Feature-1 | 20% | |
| Application Feature-2 | 20% | |
| Application Feature-3 | 10% | |
| Domain Knowledge | 30% | |

Table 3 includes fields such as knowledge areas, weightage and client SME rating score. Knowledge areas include different types of knowledge areas such as functional knowledge, domain knowledge, various features of the application, and so forth. Weightage describes the importance or relevance of a particular knowledge area in calculating the client SME rating score. For example, in table 3, the two applications, application 1 and application 2, have an equal weightage, i.e., 50%, and all knowledge areas for a particular application have a combined weightage of 100%. In other words, 50% weightage of application 1 is divided into different parts such as 20%, 10%, and so forth corresponding to the different knowledge areas. It will be evident to a person skilled in the art that different knowledge areas can have the same or a different weightage. Client SME rating score represents the score provided by the client SME to the second set of users for each of the knowledge areas. The client SME rating score is a sum of scores provided by the client SME to each of the second set of users. The client SME rating scores are provided by the client SME on a scale of 0 to 4 based on the perception of the client SME on the knowledge of the second set of users. A score of 0 implies 'No knowledge at all', a score of 1 means 'Elementary theoretical knowledge', a score of 2 refers to 'Elementary hand on experience', a score of 3 means 'Comfortable with the system' and a score of 4 means 'Expert—can train others'. Further, the total score of each application is calculated as follows:

Total score of each application=Weightage*Rating score

The total score of each application is used for validating the accuracy of the plurality of knowledge elements corresponding to the application that are captured and transferred to the second set of users. It also assists in validating the association between the plurality of knowledge elements.

The scoring dashboard feature of knowledge validation module 106 assists the first set of users and the client SME in assessing or validating the knowledge of the second set of users. The scoring dashboard feature is based on the other three features of knowledge validation module 106, i.e., the quiz feature, the self rating feature, and the client SME rating feature. The scoring dashboard provides two key metrics—a support effectiveness index and a knowledge quotient index.

The support effectiveness index is used to determine the knowledge of one or more of the second set of users taking complete ownership of the support and maintenance of the applications being transitioned. Each of the second set of users need not have complete knowledge of all aspects of the invention. It is sufficient to have even one of the second set of users to have complete knowledge in all aspects of the application and the remaining second set of users to have knowledge of one or more aspects of the application. The sufficiency is determined by the score set of the estimated readiness index value for each application. This is determined based on complexity of the application, service level agreement and team size required to support and/or maintain the application.

The support effectiveness index is calculated as follows:

Support effectiveness index=Sum of actual readiness index of each application/Total estimated readiness index of each application Actual readiness index of an application=Weightage score of the application*[[Weightage score of quiz*Average actual score of team in quiz]*[Weightage score of self rating*Average actual score of team in self rating]*[Weightage score of SME rating*Actual score of team by SME rating]]

Estimated readiness index of an application=Weightage score of the application*[[Weightage score of quiz*Average estimated score of team in quiz]*[Weightage score of self rating*Average estimated score of team in self rating]*[Weightage score of SME rating*estimated score of team by SME rating]]

The knowledge quotient index is used to determine if the second set of users collectively have complete knowledge of all aspects of the application. This index sets a goal for all the second set of users taken as a team, to gain the complete knowledge of the application over a period of time in the steady state phase.

The knowledge quotient index is calculated as follows:

Knowledge quotient index=Sum of actual knowledge score of each application/Total possible knowledge score of each application Actual knowledge score of an application=Weightage score of the application*[[Weightage score of quiz*Sum of actual score of team in quiz]*[Weightage score of self rating*Sum of actual score of team in self rating]*[Weightage score of SME rating*Actual score of team by SME rating]]

Total possible knowledge score of an application=Weightage score of application*[[Weightage score of quiz*Maximum sum of possible score of team in quiz]*[Weightage score of self rating*Maximum sum of possible score of team in self rating]*[Weightage score of SME rating*Maximum possible score of team by SME rating]]

A knowledge assessment model is defined in such a way that the support effectiveness index is always less than the knowledge quotient index. In an ideal transition scenario, the support effectiveness index is equal to the knowledge quotient index. The support effectiveness index provides an indicator of the current knowledge level of the second set of users taken as a team and thereby tracks the performance risk. The knowledge quotient index tracks the knowledge management risk of the second set of users as a team.

Knowledge validation module 106 calculates the two key metrics, i.e., the support effectiveness index and the knowledge quotient index, and publishes them for the second set of users. Further, the scoring dashboard provides a graphical representation of the two key metrics as illustrated and explained in conjunction with FIG. 5. The two key metrics are graphically represented in various formats such as a line graph, a pie chart, a bar graph, and so forth. The two key metrics are graphically represented on the basis of the timelines or duration of the transition process.

Collaboration module 108 establishes collaboration between the first set of users and the second set of users. The collaboration thus provided enables communication between the first set of users and the second set of users during the transition of the one or more applications. Collaboration module 108 enables the first set of users and the second set of users to communicate in a synchronous and an asynchronous manner. The collaboration is enabled through joint document creation, managing knowledge, workflows, sharing of knowledge transfer recording sessions, instant messaging between the first and the second set of users, and participation in discussion forums. Collaboration module 108 has been explained in detail in conjunction with FIG. 4.

Security module 110 authenticates the first set of users and the second set of users accessing framework 100. Security module 110 also authorizes the first set of users and the second set of users for accessing framework 100. Security module 110 provides proper authorization for accessing information such as the plurality of knowledge elements, information corresponding to the one or more applications, and so forth. Security module 110 uses an Active Directory to validate user credentials for authenticating the first set of users and the second set of users. An Active Directory is a hierarchical structure of objects belonging to or categorized into three broad categories: resources such as, printers; services such as emails; and users such as user accounts and groups. The Active Directory stores and provides information on the objects, organizes the objects, controls access, and sets security. Framework 100 is accessed over a network, for example, Internet, intranet, Xtranet, and so forth. In an embodiment of the invention, the first set of users accesses framework 100 through the Internet using secured Hypertext Transfer Protocols (HTTPs). Further, the second set of users accesses framework 100 through intranet, Xtranet (Xnet) or Virtual Private Network (VPN). Further, security module 110 provides a secured access to the first and the second set of users based on access rights or permissions provided to them. The first and second set of users can thereby access one or more features or modules of framework 100 using their access rights. Further, the access rights can be set or divided into multiple granular levels or permission levels, such as folder/document level, plan/multiple plan level, feature level, framework/workbench level, and so forth. For example, a user can be granted access rights for accessing a specific document in framework 100.

Each of the first and the second set of users are mapped to one or more roles that are assigned using security module 110. The one or more roles assigned to a user refer to the responsibilities assigned to the user or the transition activities that the user needs to perform during the transition of the one or more applications. For example, one or more of the second set of users are assigned the role of a transition manager, and so forth. It will be evident to a person skilled in the art that a single user can be assigned several roles in the transition process of different applications. Further, each of the roles defined in framework 100 is assigned permissions or access rights for accessing the various modules and/or features of framework 100. The first and the second set of users having different roles are further classified into one or more user groups based on their roles and responsibilities. Security module 110 also provides a functionality of adding and/or deleting a user(s) from various user groups. Furthermore, security module 110 enables modification of user information such as display name, email ID, and so forth assigned to various user groups. In an embodiment of the invention, creation and deletion of various user groups, and addition and deletion of users in various groups is performed by a user, for example, an administrator of framework 100.

Security module 110 also displays information corresponding to the first and the second set of users. The information corresponding to a user or user-specific information includes, but is not limited to, personal details, roles and responsibilities assigned to the user, user groups, tasks assigned, issues and risks assigned, tasks for approval, knowledge elements for approval, and so forth. The information corresponding to the first and the second set of users is displayed based on the accessing of the framework by the first and the second set of users. In other words, the information for one of the first and/or the second set of users is displayed if framework 100 is accessed by the particular user.

Governance module 112 enables a user to monitor the status of the transition of the one or more applications. A user, such as the first set of users, the second set of users, and so forth, actively monitors the status of the transition process using governance module 112. Governance module 112 provides one or more features for monitoring the status of the transition process. Examples of the features of governance module 112 include, task management, dashboard, issues and risks identification, work stream dashboard, indicators, and so forth.

The task management feature of governance module 112 enables viewing of the one or more transition activities or tasks assigned to various users accessing framework 100. The task management feature further provides a personalized view of the tasks assigned to a single user accessing framework 100 for the transition of various applications. Further, the task management feature provides a personalized view of tasks assigned to a user across various clusters. A logical group of applications classified based on various factors such as business domain, technology, location, and the like is hereinafter referred to as a cluster. The user, also referred to as a transition team member, participates in the transition process and updates the status of the tasks assigned to him/her. The transition team member updates the status upon completion of a task and sends it for approval to a cluster manager or a person managing the transition of a cluster. The cluster manager can further view the list of tasks to be approved by accessing or logging in framework 100. On approval of a task by the cluster manager, the completion status of the task gets updated in the transition plan and is further reflected on the dashboard.

The issues and risks identification feature of governance module 112 enables identification of issues or problems and risks at two different levels—transition program level and task level. The issues and risks identified at the transition program level are standalone issues and risks. Examples of the program-level risks include unplanned attrition, delayed communication, and delay in achieving milestone. Non availability of an SME and insufficient documentation are the examples of the task-level risks. Further, the issues and risks are also identified for the various tasks or transition activities corresponding to different clusters. The issues and risks at both levels are assigned to the transition team member and are also reflected in the personalized dashboard of the transition team member.

Governance module 112 provides a dashboard for a consolidated view of the status or progress of the transition process, i.e., the dashboard provides a consolidated view of the status of the various phases or stages of the transition process. Further, the dashboard provides an aggregate or consolidated view of one or more transition plans and information at a wave (or a group of clusters), cluster and resource level in accordance with a plurality of parameters. The plurality of parameters includes effort estimate or effort deviation, resource estimate, percentage completion, issues, and risks. The dashboard enables comparative viewing of a predefined set of information, for example, wave-level percentage completion, wave-level planned vs. actual effort, cluster-level plan percentage completion, cluster-level planned vs. actual effort, and resource-level planned vs. actual effort.

Governance module 112 also provides a work stream dashboard for a consolidated view of non-application related transition tracks, also referred to as work streams such as infrastructure, logistics, process integration, and so forth. The work stream dashboard provides a predefined set of views for each of the one or more work streams. The views provided by the work stream dashboard include sub process vs. percentage delay, and a count of open issues and open risks for each work stream. Each work stream is defined based on multiple process steps also referred to as sub processes. The views provided by the work stream dashboard provide status updates at sub process level within each work stream and therefore, enable effective tracking of the work streams. Further, the indicators feature of governance module 112 highlights the overall status of the open risks and open issues based on the business rules. The risks and issues are highlighted with different colors, such as red, green, amber, and so forth, based on the following business rules:

a) Show risks and issues in red if the status of the transition is open for more than 15% of scheduled close date.
 b) Show risk and issues in amber if the status of the transition is open for more than 10% of scheduled close date.
 c) Show the status in green if the status of the transition is open for less than 10% of scheduled close date.

Governance module 112 provides a drill-down facility from a wave-level plan to a cluster-level plan and from cluster-level plan to a specific task. Further, governance module 112 updates and tracks issues and risks, and provides one or more alerts and one or more notifications for updates on the status such as task, content, and events. Governance module 112 provides a workflow-driven auto escalation mechanism based on a threshold set for open issues/open risks and pending tasks. The output of governance module 112 includes transition risk analysis, mitigation strategy, and transition status reporting.

Governance module 112 also publishes the status of the transition for the organization. Governance module 112 captures and publishes the performance of the transition process. The transition performance is captured and published using various details such as schedule deviation, effort deviation, number of defects per page, and so forth. Transition performance details are captured or measured as follows:

Schedule deviation: (Actual completion date−Planned completion date)/Planned completion date*100%

Number of defects per page: Total defects identified in document/Number of page

Effort Deviation: (Total actual effort−Planned effort)/Planned effort*100%

Publishing of the transition performance enables integration of framework 100 to project management systems such as Integrated Project Management (IPM+) developed by Infosys®, and so forth. The integration thereby enables organization-level process improvements.

Reports module 114 generates one or more reports based on the status of the transition. The output of governance module 112 is used by reports module 114 for generating the reports related to the status of the transition such as outstanding issues, risks, milestone delays, cost, and so forth. Some examples of the reports generated by reports module 114 include wave-level transition status, cluster-level transition status, contact details of the first set of users, and so forth. Reports module 114 also generates reports based on information corresponding to one or more work streams such as logistics, infrastructure, and so forth. Some examples of the reports related to information on work streams include resource-level task progress, team list and visa status, team location and transfer status, asset/equipment allocation status, work stream completion status, and so forth. Reports module 114 generates one or more reports for the transition manager. The one or more reports include ageing reports such as a list of open issues, open risks, and new documents.

In an embodiment of the invention, framework 100 includes a transition process repository module for providing templates, process guidelines, checklists, best practices, estimation models, and learning captured in blogs and risk database defined and published for the transition. In another embodiment of the invention, framework 100 includes a transition analytics module for providing a dashboard on the transition process capability baseline. Further, the transition analytics module provides one or more trend charts on the performance of multiple transition engagements.

Figure 2:
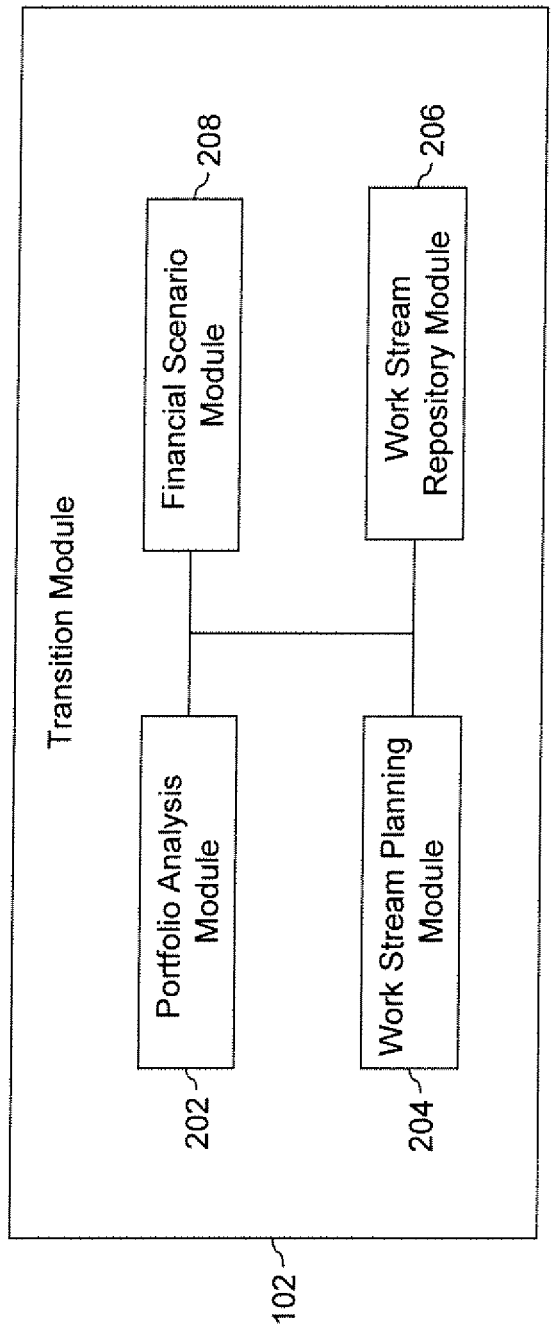
FIG. 2 is a block diagram of a transition module, in accordance with an embodiment of the invention.

FIG. 2 is a block diagram of transition module 102, in accordance with an embodiment of the invention. Transition module 102 includes a portfolio analysis module 202, a work stream planning module 204, a work stream repository module 206, and a financial scenario module 208.

Portfolio analysis module 202 enables a user to analyze the information corresponding to the one or more applications. The information corresponding to the applications includes information describing the applications, i.e., various attributes of the applications, for example, business domain, name, size, criticality and so forth. The information corresponding to the applications also includes information describing the environment in which the application is implemented, for example, programming language of the application, security compliance, and so forth. The information corresponding to the applications is analyzed on the basis of one or more criteria. The one or more criteria used for the analysis include one or more dimensions such as complexity, criticality, stability, and so forth. In an embodiment of the invention, a user analyzes the information corresponding to the one or more applications based on the ease of maintenance and the ease of transition. The information corresponding to the applications is analyzed for generating one or more transition plans. It will be evident to a person skilled in the art that the analysis of the information by portfolio analysis module 202 is performed during the due diligence phase of the transition process.

Portfolio analysis module 202 enables a user to categorize the one or more applications into one or more clusters. The categorization of the applications into one or more clusters is performed based on a predefined criterion. For example, the business function and technology of the applications are used as criteria for categorizing the applications into various clusters. In an embodiment of the invention, the user performing the categorization of the applications into various clusters is a transition manager. Further, portfolio analysis module 202 enables a user to assess the one or more clusters containing different applications. The clusters are assessed on the basis of one or more scores of the applications included in the corresponding clusters. In an embodiment of the invention, various scoring techniques are used to determine scores of the applications. The applications are provided scores on the basis of different parameters or dimensions such as complexity, stability, criticality, and so forth. The scores of an application assist in determining or assessing the suitability of the application in the transition process. In an embodiment of the invention, the user performing the assessment of the applications on the basis of their scores is a transition manager. Therefore, portfolio analysis module 202 enables a multi-dimensional analysis of the information corresponding to the applications. The complexity assessment of the applications within the clusters determines the complexity rating of the cluster. Each application is marked or rated as simple, medium or complex based on its complexity. It will be evident to a person skilled in the art that a rating of an application can be denoted in various formats and also the rating can be divided into multiple categories or levels. The complexity rating of a cluster is calculated by counting the number of applications rated as simple/medium or complex. A cluster is provided a rating based on the category of the maximum number of applications within the cluster. This cluster rating is then used as an input for generating the transition plans. Transition module 102 selects a transition template on the basis of the complexity rating of the clusters, i.e., the assessment of the clusters.

In an embodiment of the invention, portfolio analysis module 202 generates a graphical representation of the one or more clusters on the basis of the assessment of the clusters. Various clusters containing different applications classified based on their business domains are represented graphically in various formats such as pie charts, scatter charts, bubble charts, and so forth. In another embodiment of the invention, portfolio analysis module 202 generates a graphical representation of one or more attributes of the application such as complexity, criticality, and so forth. Further, portfolio analysis module 202 enables a user to identify a set of applications from the one or more applications. The applications are identified based on the assessment of the clusters of the corresponding applications. In an embodiment of the invention, the applications are identified based on the graphical representation of the clusters of the corresponding applications. The set of applications thus identified are suitable for offshoring or outsourcing. In other words, the maintenance and support of the identified set of applications is transferred to a different set of users at the same and/or different location.

In an embodiment of the invention, portfolio analysis module 202 enables a user, for example, a transition manager to prioritize the one or more clusters for transition sequencing. The one or more clusters are prioritized based on the assessment of the clusters. In an embodiment of the invention, the graphical representation of the clusters assists in prioritizing the clusters. The clusters need to be prioritized in case a large number of applications are categorized into different clusters. For example, if 500 applications of an organization need to be transitioned, then the applications and their corresponding clusters need to be prioritized for sequencing of the transition process. These 500 applications and their corresponding clusters are represented graphically which assists in the prioritization of the clusters. Portfolio analysis module 202 therefore, provides a process for scoring of applications on the one or more dimensions. Further, portfolio analysis module 202 enables analysis of the information to determine the sequence and logical grouping of applications to optimize duration, effort and risk in the transition. Portfolio analysis module 202 helps in optimal grouping and sequencing of the applications.

In an embodiment of the invention, portfolio analysis module 202 includes an engagement context module for recording information related to one or more dimensions for factoring context of the transition of the applications. The one or more dimensions include a plurality of portfolio complexities, a plurality of engagement characteristics, and the plurality of transition scenarios. The plurality of portfolio complexities includes application complexity and service complexity. The plurality of engagement characteristics includes location of the client, environment, and risks involved in the transition. The plurality of portfolio complexities includes status of the source code and documents used in the transition process.

In another embodiment of the invention, portfolio analysis module 202 includes a wave management module for accepting inputs from portfolio analysis module 202 and defining the number of waves in the transition. A wave is defined as a unit of period of transition. The wave guides or enables the transition manager to formulate an execution plan for the transition using a top-down approach.

In yet another embodiment of the invention, portfolio analysis module 202 includes a cluster planning module for enabling mapping of the one or more clusters defined by portfolio analysis module 202 to the corresponding waves. The cluster planning module includes automatic creation of a cluster-level project plan using one or more pre-defined templates and attributes of application clusters created during the due diligence phase. A cluster is defined as a logical grouping of one or more applications which ensures that transition planning is carried out on a similar set of applications. The transition plans defined based on the waves are further detailed by users such as cluster leads using the cluster planning module. This supports the top-down planning and bottom-up reporting approach in which the planning parameters are decided by the transition manager and each individual user working on the transition provides the task-related data.

Work stream planning module 204 generates one or more transition plans on the basis of one or more work streams. Work streams refer to tracks, such as infrastructure, domain, and so forth, which are not related to knowledge transfer. The one or more work streams include, but are not limited to, domain knowledge, process integration, organization transition planning, contract management, engagement staffing, logistics, infrastructure, and application transition. The transition process includes transition of the various work streams of which application transition is the key or main part. Framework 100 supports the transition of the various work streams of the organization.

Each work stream is defined based on multiple process steps also referred to as sub processes. For example, the infrastructure work stream consists of various sub processes such as physical connectivity, physical infrastructure, physical transition tool implementation, offshore technical working model and so forth. Each sub process further includes various specific activities or tasks. For example, the physical connectivity sub process includes various tasks such as completing 'Infrastructure Planning' worksheet, developing test plan using 'Infrastructure Test Plan' worksheet, executing test plan, and so forth.

A user such as a transition manager decides applicability of the one or more work streams based on the information corresponding to the one or more applications. Further, the applicability of sub processes within a work stream is also decided by the user. Once the user selects an applicable work stream and applicable sub processes within the work stream, work stream planning module 204 generates the transition plan based on the particular work stream.

The application transition work stream pertains to transition of the knowledge relating to the structure, environment, code and business functions of the applications. It also includes transition of the method(s) followed by the clients for maintenance and support of the applications. The logistics work stream includes activities related to ensuring that all people deployed for the transition process have desks, computers, tools, IDs, and system accesses necessary to perform their work in a timely manner. The domain knowledge work stream provides a systematic and formal way of representing the business architecture of the organization or enterprise. The business architecture includes the Lines of Business (LOBs), functions, processes and IT systems of the organization. The domain knowledge work stream therefore acts a business baseline of the organization and helps in identifying the scope of outsourcing or offshoring. The infrastructure work stream includes infrastructure that enables all people involved in the transition to perform all the services in the scope of maintenance. The tasks or activities included in this work stream are physical connectivity, physical infrastructure, physical transition tool, implementation, offshore technical working model definition, and offshore environment setup. The engagement staffing work stream includes all co-ordination activities involved in the transition. The co-ordination activities ensure that the project is staffed with resources or users having the right skill sets, at the right time, and at the right location. The contract management work stream includes activities to understand the terms and conditions of the contract and support of the applications. The transition team understands the terms and conditions to answer various contractual questions. The organization transition planning/communication work stream involves proactive planning and communication to ensure a smooth transition of the roles and responsibilities assigned to various people from a current state to a future state. This work stream is applicable for large transitions involving a significant amount of change at the organizational and operational level within a short period of time. The process integration work stream involves understanding of the processes followed by the client. It also includes planning on the coordination between the client and the processes based on Capability Maturity Model® Integration (CMMI) and Global Delivery Model followed by the second set of users.

In an embodiment of the invention, work stream planning module 204 provides one or more context based transition features. The one or more context based transition features help a user, for example, a transition manager, to define the transition plans for one or more work streams. Work stream planning module 204 is further configured for storing the one or more transition plans based on the one or more work streams. The transition plans are stored for future reference and search in various other transition processes. Work stream planning module 204 enables a user, for example, a transition manager, to manage the one or more transition plans based on the one or more work streams. Work stream planning module 204 further provides a top-down planning structure. The top-down planning structure enables creation and allocation of tasks to one or more users or resources from the second set of users. Further, the structure provides a task window through which task efforts and completion status can be filled by the one or more users. Subsequently, the task window provides comprehensive status reports across various plans and tracks. One or more management controls are defined and tracked on the basis of one or more metrics. The one or more metrics include effort, defects, schedule, and cost. The management controls enable the transition manager to perform an analysis on milestones of the transition process and establish a capability baseline for the transition manager.

Work stream repository module 206 stores information corresponding to the one or more work streams such as logistics, infrastructure, and so forth. The information corresponding to the one or more work streams includes information required for implementation of the transition plans, for example, details of assets such as computers, desks, and so forth; and details of people involved in the transition process, and so forth. Work stream repository module 206 enables a user, for example, a transition manager, to manage the information corresponding to the one or more work streams. The management of the information corresponding to the work streams includes managing allocation of people and assets to the engagement. Details such as staff location, contact details, role details, and so forth are stored, managed and reported as and when required. In an embodiment of the invention, the plurality of knowledge elements includes the information corresponding to the one or more work streams for generating the transition plans based on the one or more work streams. The information corresponding to the one or more work streams is therefore used for generating the transition plans and managing the transition of the one or more applications.

Work stream repository module 206 provides a set of features for managing the information corresponding to the one or more work streams. The features include, but are not limited to, cluster-skill set mapping, staffing point system, and staffing-visa tracker. The cluster-skill set mapping highlights the demand aspect of staffing requirements for transition execution. The cluster-skill set mapping requires several inputs from the transition plan. The inputs required from the transition plan include information such as wave details, cluster details, location, transition timelines, staffing needs as per calendar dates, and so forth. In an embodiment of the invention, the cluster-skill set mapping is represented in a tabular format as depicted in Table 4.

TABLE 4

| | | | | | August | | | | September | | | |
|---|---|---|---|---|---|---|---|---|---|---|---|---|
| Wave Name | Cluster Name | Wave Lead | Cluster Lead | Location | 7 | 14 | 21 | 28 | 4 | 11 | 18 | 25 |
| W1 | C1 | R1 | RC1 | London | 2 | 2 | 4 | 4 | 4 | 4 | | |
| | | | | India | 4 | 4 | 4 | 4 | 4 | 4 | | |
| | C2 | R1 | RC2 | NewYork | 2 | 2 | 3 | 3 | 3 | 3 | | |
| | | | | India | 4 | 4 | 4 | 4 | 4 | 4 | | |
| W2 | C3 | R2 | RC3 | London | | | | | 3 | 3 | 3 | 3 |
| | | | | India | | | | | 5 | 5 | 5 | 5 |

Cluster-Skill Set Mapping

The staffing point system feature of work stream repository module 206 provides point-based assessment of staff (or the transition team) to employ or staff the right set of people at the right location based on the needs of the transition project. Each member of the transition or the second set of resources is objectively evaluated based on the point system framework so that the issues and risks are highlighted upfront. Some of the issues and risks involved are short fall of staffing needs, short fall of skill set, travel and visa issues, and so forth. This evaluation methodology is useful in the context where staffing requirements are high and the transition is executed in various geographical locations. Various key inputs are required for the point system framework for the evaluation. In an embodiment of the invention, the key inputs required for the evaluation and the evaluation methodology are represented in a tabular format as depicted in Table 5.

TABLE 5

Point System Framework for Evaluation

| Evaluation Criteria | Weightage | Score [1-10] | Net Points = Weightage * score |
|---|---|---|---|
| Total IT Experience | 20% | | |
| Experience relevant to Transition Project | 25% | | |
| Business knowledge skills | 10% | | |
| Technology skills | 10% | | |
| Soft skills & Process skills | 5% | | |
| Visa availability | 10% | | |
| Travel availability | 10% | | |
| Special Constraints | 10% | | |
| | Cut Off score = 75 Points | | |
| Total Score | | | |

Table 5 includes fields such as evaluation criteria, weightage, score, and net points. Evaluation criteria refer to input parameters or inputs required for evaluating the skill set of a person before employing him/her for a particular job or task. The input parameters include a person's total IT experience, technology skills, soft skills, and so forth. Weightage describes the importance or relevance of a particular evaluation criterion in calculating the net points, and the overall evaluation. For example, weightage of total IT experience is 20%, whereas the weightage of technology skills is 10%. It will be evident to a person skilled in the art that different evaluation criteria can have the same or a different weightage and the combined weightage is 100%. Scores are provided to the various evaluation criteria based on their relevance in the context of a particular person being evaluated. The scores are provided on the scale of 1 to 10. The net points for each evaluation criteria are calculated as a product of weightage of the evaluation criteria and its corresponding score. The cut off score refers to the minimum score of evaluation based on which the person is employed for a particular task in the transition process. Further, the point system framework and weightage are customized for each cluster based on the requirements of the cluster.

The staffing-visa tracker feature of work stream repository module 206 tracks the overall staffing status of each of the second set of users. Each staff qualification captured in the staffing-visa tracker is evaluated on the basis of the point system framework and respective points are assigned to each user. In an embodiment of the invention, the staffing-visa tracker is represented in a tabular format. The staffing-visa tracker includes several fields such as wave name, cluster name, estimated resources, resource information, skill set, travel location, travel type, expected start date, expected end date, actual start date, actual end date, visa status, travel status, and overall staffing status. The overall staffing status for each user is depicted using different colors depending on the net points of the user in the point system framework. For example, the overall staffing status is depicted in red if the net points are below 50, yellow if the net points are in the range of 60 to 70, and green if the net points are above 75. The staffing status is aggregated at the cluster and wave levels to depict the staffing status for the transition execution. This also helps in identifying the issues related to transition timelines and taking necessary corrective actions. The current status of the staffing for a transition project is depicted in a tabular format, as shown in Table 4 with the relevant cells depicting the staffing highlighted in various colors depending on the net points.

In an embodiment of the invention, work stream repository module 206 includes a logistics planning module. The logistics planning module enables a user, for example, the transition manager, to manage each of the second set of users. Further, the logistics planning module enables tracking of the movement of each of the second set of users and the related assets during the transition. Furthermore, the logistics planning module records details of each of the second set of users, details of each of the first set of users, details of assets, movement of the first and second set of users, and generation of reports for the details mentioned above. These details can be stored and reported as needed.

In another embodiment of the invention, work stream repository module 206 includes an engagement staffing module that enables management of training status, skill status, staff allocation, and a resource ramp up plan. The resource ramp up plan is auto generated based on mapping of clusters with waves or work streams with waves.

Financial scenario module 208 determines and analyzes the overall cost of the transition. The transition process involves the service transfer of the support and maintenance of the one or more applications. Therefore, financial scenario module 208 determines and analyzes the overall cost involved in the maintenance and support of the applications being transitioned. Financial scenario module 208 determines and analyzes the overall transition cost on the basis of a number of parameters such as the number of waves, the number of clusters of the applications, transition timelines, employee cost, travel cost, infrastructure cost, management overhead, productivity improvement targets, and so forth. Further, financial scenario module 208 develops a business case for the clients related to offshoring of transition services.

The business case feature of financial scenario module 208 consists of various sections such as current as-is cost, to-be cost post transition, benefits of offshoring/outsourcing section and risks and assumptions. These sections are listed at each cluster level. Further, financial scenario module 208 provides a plot or graph highlighting business value vs. cost for each cluster. The business value (expressed in %) is derived based on benefits that the cluster will provide due to offshoring/outsourcing and cost is the actual cost (in $ value) incurred for providing maintenance/support for that cluster in the steady state phase. A user decides on prioritizing cluster level outsourcing/offshoring based on the plot. In an embodiment of the invention, financial scenario module 208, determines and analyzes the overall cost of the transition in different transition scenarios. Financial scenario module 208 provides a what-if analysis model so that user can analyze the different transition costs based on various transition scenarios. The different transition scenarios are defined based on various factors such as location of execution, SME availability, documentation status, application life cycle stage, and so forth.

Figure 3:
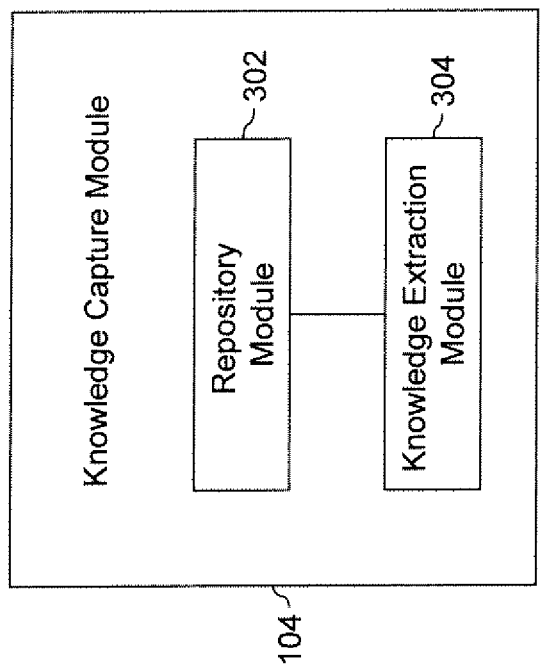
FIG. 3 is a block diagram of a knowledge capture module, in accordance with an embodiment of the invention.

FIG. 3 is a block diagram of knowledge capture module 104, in accordance with an embodiment of the invention. Knowledge capture module 104 includes a repository module 302, and a knowledge extraction module 304.

Knowledge capture module 104 captures a plurality of knowledge elements corresponding to the one or more applications and the one or more transition activities. Knowledge capture module 104 provides a controlled and centralized repository of the documents involved in the one or more transition activities. Knowledge capture module 104 enables centralized storage of discussion threads, System Appreciation (SA) documents, meeting minutes, clarifications, tacit application knowledge, and so forth. To reduce the duration for knowledge transfer phase, knowledge capture module 104 also provides or uses predefined knowledge reference components to capture the plurality of knowledge elements. The knowledge reference component includes a pre-filled template for each of the second set of users to fill the missing information on the various knowledge elements. The pre-filled information is obtained from the output of the due diligence phase of the transition process. Further, the existing business model information for the industry/domain is collected using various knowledge capturing tools, for example, business modeling tool such as Influx®, test management tool such as Rational® TestManager, application program element using Micro Focus® Enterprise View™, Incident Resolution using Intelligent Production Support Platform, Service level definitions and report layouts using Oblicore™, and so forth.

Repository module 302 stores the plurality of knowledge elements such as business processes, test cases, source code, incident resolution, service level agreements, and so forth. Repository module 302 also stores the information corresponding to the one or more applications. Repository module 302 also provides a centralized document repository that captures all artifacts shared by the client as a part of the due diligence phase and the knowledge transfer phase. Further, repository module 302 provides a repository to share all SA documents with all stakeholders or the client. The system appreciation document elaborates or describes the business functionality supported by an application, application features, application design and architecture, support process, support contacts, key resolutions, and so forth. Repository module 302 further provides a repository to share the due diligence findings and deliverables with all the stakeholders. Repository module 302 also provides auto creation of a folder structure for each application based on the list of applications. The folder creation assists the transition team in logically structuring the knowledge base.

Repository module 302 provides an access controlled repository of the documents shared in between the first and second set of users. The access controlled repository ensures that there is no loss of information and overwriting of documents. It also ensures that the entire first and the second set of users work on the same document repository. Further, repository module 302 provides an offline access to the access controlled repository and, therefore, enable an offline review of the documents. It further ensures that once the online access is re-established, the latest updates are synchronized. Repository module 302 provides search capabilities to access the access controlled repository and provides relevant search results. The access provided includes access to best practices, templates and guidelines for standardization of the one or more transition activities.

Repository module 302 further provides a templates repository for storing and providing all knowledge reference components such as templates used as a part of the due diligence phase. The templates are derived out of best practices followed in various transition processes. Furthermore, repository module 302 provides inbuilt alerts to communicate the status of the stored documents. For example, an alert in the form of an email is generated and sent to the entire first and second set of users in case anyone from the first and the second set of users modifies any document stored in repository module 302. Repository module 302 also provides alerts regarding changes made to the access controlled repository.

Repository module 302 also provides content management in terms of mapping the templates to the repository. Further, the knowledge captured in terms of business models, system appreciation documents, test cases, and so forth is moved into a steady state repository by repository module 302. The knowledge is stored for future reference and changes.

Knowledge extraction module 304 extracts the information corresponding to the one or more applications from the first set of users. Knowledge extraction module 304 provides one or more knowledge capturing tools for capturing the knowledge elements, i.e., information related to business, system and testing. For example, Influx® captures the domain process at a cluster level and the system process for each application within a cluster. Further, the IPSP tool provides a knowledge-based platform with a suite of tools for incident diagnosis and maintains an incident resolution knowledge repository. Knowledge capturing tools, also referred to as application mining tools, assist in capturing knowledge in case the client SME is unavailable or the client expects a non-intrusive based transition. The application mining tools reverse engineer the source code of the application and define the application design and functionality. The application mining tool mines the code and devises call graphs and also highlights technology-related metrics such as maintainability, and so forth.

Further, the one or more knowledge capturing tools enable mapping across the information related to business, system, and testing. The one or more knowledge capturing tools involve developing an inventory of application elements, building relationship between application elements and enabling visual comprehension of the system. The building of relationship between application elements includes associating a business process model or a use-case with the system elements or application elements that execute the use-case, and establishing relationship between a use-case and a test case. The three-way relationship between the business process model, test cases, and application elements increases the knowledge comprehension capability of the new resources resulting in a traceability matrix. The one or more knowledge capturing tools help in accelerating the one or more transition activities and improve the efficiency of recording of information. The information can then be used during the steady state operations. Furthermore, knowledge extraction module 304 also enables building of system knowledge using a case-based approach. The case-based approach involves development of a use-case catalogue of the system and business process models for recording business knowledge. Further, the case-based approach is used to capture the application business knowledge and is associated with application elements and the test cases.

Figure 4:
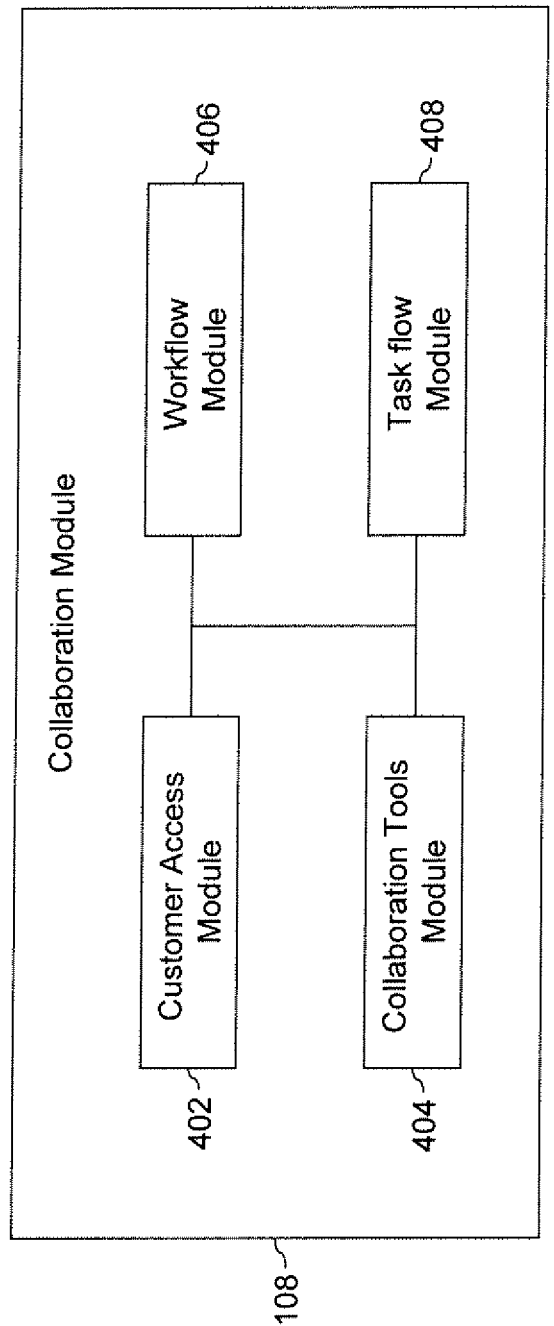
FIG. 4 is a block diagram of a collaboration module, in accordance with an embodiment of the invention.

FIG. 4 is a block diagram of collaboration module 108, in accordance with an embodiment of the invention. Collaboration module 108 includes a customer access module 402, a collaboration tools module 404, a workflow module 406, and a task flow module 408.

Collaboration module 108 provides or establishes collaboration between the first set of users and the second set of users. The collaboration between the first and the second set of users enables communication between them during the transition of the one or more applications. The first and the second set of users can communicate in a synchronous and an asynchronous manner using collaboration module 108. Collaboration module 108 provides a context-based collaboration between the first and the second set of users through joint document creation, managing knowledge, workflows, sharing of knowledge transfer recording sessions, instant messaging between the first and the second set of users and participation in discussion forums. Further, collaboration module 108 provides a process orchestration feature that enables it to interact with internal and external tools in one or more areas. The one or more areas include incident/problem management, knowledge management, testing management, service level agreements (SLA) management, and project management.

Customer access module 402 enables the first set of users and the second set of users to access framework 100. Customer access module 402 enables each of the first set of users to participate in the transition along with the second set of users. The participation is enabled by accessing framework 100. A personalized portal is provided for each participant for accessing information relevant for performing a task. Framework 100 is accessed over a network such as Internet, intranet, and so forth. Customer access module 402 provides access to the first set of users or the client to participate in the transition process and to view the overall transition status.

Collaboration tools module 404 provides one or more collaboration tools that enable communication between the first and the second set of users. Collaboration tools include, but are not limited to, live session recorders, screen capturing tools, wikis, blogs, RSS feeds and reviews, and participation in discussion forums. Further, survey or quiz features are provided for the second set of users to obtain feedback through quizzes or surveys. These features assist in validating knowledge of the second set of users on the applications. They help in increasing efficiency and participation in the one or more transition activities. The quizzes and surveys are conducted during the completion of the knowledge transfer phase of the transition process and act as a gating criterion for proceeding into the next phase or stage of the transition. A discussion forum is a centralized repository that captures discussion threads around clarification of information or any issues among the stakeholders. Wiki is a collaboration tool used to build a tacit knowledge base of each application. A plurality of wiki templates is also used to enable collaborative editing between the first set of users and the second set of users. Live meeting is a standalone web-based tool for capturing audio and video recordings of knowledge transfer sessions. These recordings are later retrieved and used to obtain a clear understanding of the applications and also assist new users joining the transition team. Meeting plan is a collaboration tool that enables a transition manager to organize various meetings between the first and the second set of users. The meetings include SME interview meetings, transition program review meetings, and so forth. The meeting plan feature is integrated with Microsoft® Outlook meeting feature and therefore, updates or blocks time in the user's calendar according to the meeting's date and time.

Workflow module 406 enables a user to manage the plurality of knowledge elements such as business models, test cases, and so forth. Workflow module 406 enables a user to manage various documents used in the transition activities. The documents include information corresponding to the one or more applications used in the transition process. The management of the knowledge elements includes managing one or more versions of the knowledge elements. The documents used in the transition process and the plurality of knowledge elements are updated by the first and the second set of users throughout the transition process. Workflow module 406 manages and stores each version of the documents and the information. Workflow module 406 includes configuration management to ensure that the latest version of the information is available. It will be evident to a person skilled in the art that workflow module 406 operates in conjunction with repository module 302 for managing the plurality of knowledge elements and the documents used in the transition activities. Further, workflow module 406 maintains a historical log of changes or modifications made to the knowledge elements, documents, and so forth. The historical log contains information such as name, user group, and so forth about the user who makes changes to the knowledge elements. Furthermore, workflow module 406 provides features such as a document workflow, and so forth. The document workflow establishes collaboration by moving semi-furnished work among all the relevant stakeholders and delivering the collaboratively developed work package. This feature enables the second set of users working from remote locations to work together in getting inputs for knowledge transfer documents and also getting the documents reviewed simultaneously. This feature increases participation of the incumbent resources in the transition process and also increases the transparency on tasks with the client and thereby enables building of trust with the client.

Task flow module 408 enables a user to manage the one or more transition activities or tasks. Task flow module 408 thus provides transition planning or task flow tracking workflow. This workflow enables the transition manager to create cluster-level plans using a top-down approach. Once the transition plan is created, the transition manager assigns resources or users to various tasks, updates timelines and effort required for the tasks and finally publish the transition plan. Once the transition plan is published within framework 100, the transition team members can view the list of tasks assigned to them. Task flow module 408 also facilitates the transition team members to capture status information at the task level which is then submitted to transition manager for approval. Once the transition manager approves the task, the status is further rolled up to the cluster level and wave level. Details of task flow tracking have been explained in conjunction with FIGS. 7(*a*) and 7(*b*). The details of managing document reviews have been explained in conjunction with FIG. 8.

Figure 5:
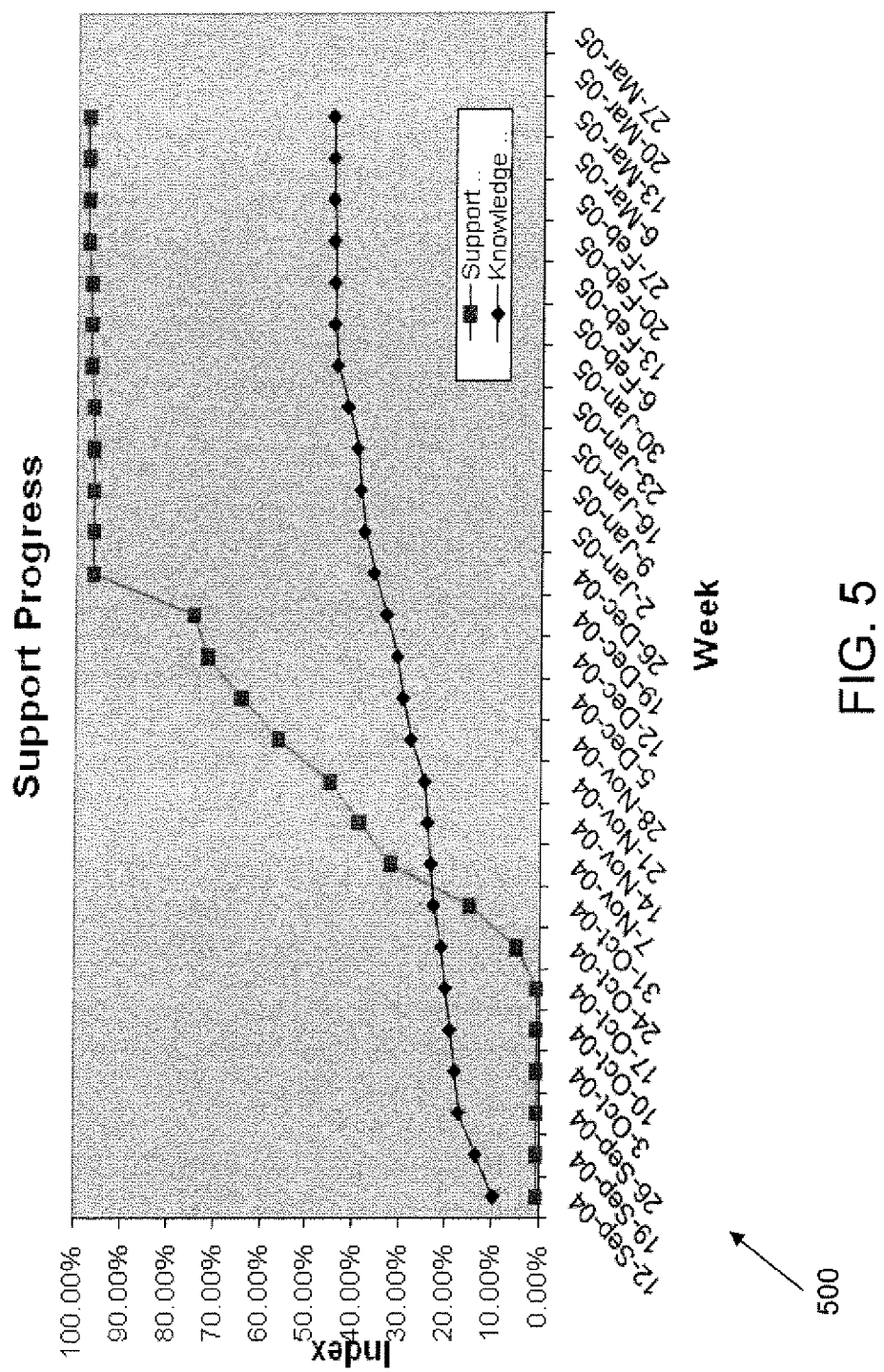
FIG. 5 illustrates a snapshot of a graphical representation of two key metrics provided by a scoring dashboard, in accordance with an embodiment of the invention.

FIG. 5 illustrates a snapshot 500 of a graphical representation of two key metrics provided by a scoring dashboard in accordance with an embodiment of the invention. The two key metrics that are represented graphically in snapshot 500 are support effectiveness index and knowledge quotient index. The support effectiveness index and the knowledge quotient index have been explained in conjunction with FIG. 1. The graph illustrated in FIG. 1 indicates the support effectiveness index and the knowledge quotient index for each week in the transition process. The graph enables tracking of knowledge transfer effectiveness and also brings transparency in the readiness for complete take over of the maintenance and support of application.

Figure 6:
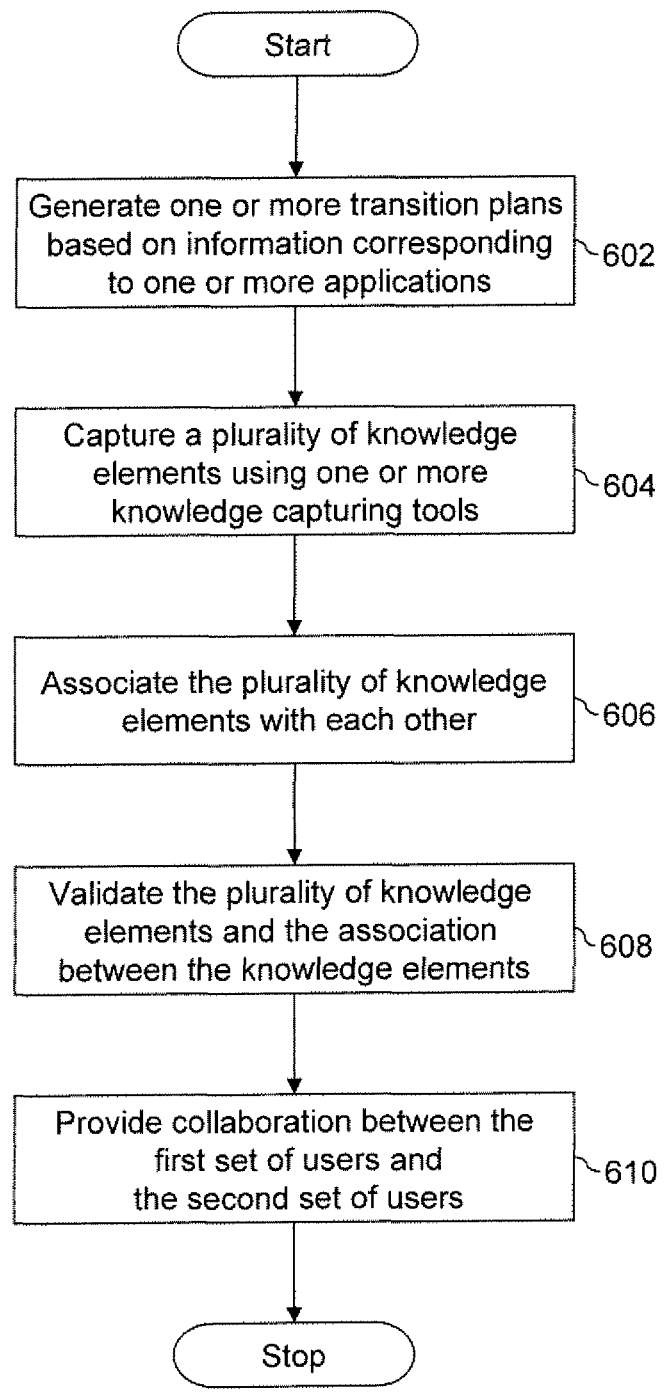
FIG. 6 is a flowchart illustrating a method for the transition of the one or more applications of the organization, in accordance with an embodiment of the invention.

FIG. 6 is a flowchart illustrating a method for the transition of the one or more applications of the organization, in accordance with an embodiment of the invention.

An organization uses several applications for supporting its various functions or business needs, for example, Information Technology (IT), business processes, Human Resources (HR), and so forth. Also, there are various applications that are managed, supported or maintained by the organization. The applications are transitioned by the organization such that the applications are supported from the same and/or a different location and by a different set of users of the same and/or a different organization. In various embodiments of the invention, the method illustrated in FIG. 6 is suitable for use in the transition of one or more applications of an organization. The method enables a user to support and manage the transition of the one or more applications of the organization. The application is transitioned from a first set of users to a second set of users. The first set of users includes business users, Subject Matter Experts (SMEs), person(s) using and/or managing the applications in the organization, and so forth. The second set of users includes person(s) belonging to the same or a different organization. Examples of the second set of users include external service providers or vendor resources, person(s) belonging to a different department or business unit of the same organization, persons belonging to the same department or business unit of the same organization other than the first set of users, and so forth. In an embodiment of the invention, the second set of users also includes the transition manager.

At 602, one or more transition plans are generated for the one or more applications. The transition plans are generated based on information corresponding to the one or more applications. The information corresponding to the applications includes information describing the applications, for example, business domain, and criticality of the applications and so forth. The information corresponding to the applications also includes information describing the environment in which the application is implemented, for example, programming language of the application, security compliance and so forth. In an embodiment of the invention, the transition plans are generated by a user, for example, a transition manager. The generation of the transition plans has been explained in conjunction with FIG. 1 and FIG. 2.

Each of the one or more transition plans includes one or more transition activities. The transition activities refer to all the activities or tasks that need to be performed during the transition process. Examples of the transition activities include, transition kick off, reviewing overall transition plans, and so forth. In other words, the transition activities refer to the activities that need to be performed during the various phases of the transition process, for example, due diligence, transition planning, monitoring, knowledge transfer, secondary support, and so forth.

At 602, the information corresponding to the one or more applications is analyzed by a user, for example, a transition manager, for generating the one or more transition plans. The information corresponding to the applications is analyzed based on one or more criteria such as complexity, criticality, and so forth. The analysis of the information corresponding to the one or more applications has been explained in conjunction with FIG. 2.

At 602, the one or more applications are also categorized into one or more clusters. The categorization of the applications is performed on the basis of a predefined criterion such as business function and technology of the application as explained in conjunction with FIG. 2. The categorization of the applications is performed by a user, for example, a transition manager. Further, at 602, the one or more clusters containing different applications are assessed by a user, for example, a transition manager. The clusters are assessed on the basis of one or more scores of the applications included in the corresponding clusters. In an embodiment of the invention, various scoring techniques are used to determine the scores of the applications. The assessment of the clusters based on the scores of the applications has been explained in conjunction with FIG. 2.

In an embodiment of the invention, a graphical representation of the one or more clusters is generated at 602. The graphical representation of the clusters is generated based on the assessment of the clusters, as explained in conjunction with FIG. 2. The clusters are represented graphically in various formats such as pie charts, scatter charts, and so forth. In another embodiment of the invention, the one or more clusters are prioritized for transition sequencing at 602. The one or more clusters are prioritized on the basis of the assessment of the clusters, as explained in conjunction with FIG. 2. The clusters are prioritized by a user, for example, a transition manager.

At 602, access is provided to the first and the second set of users to access framework 100, as explained in conjunction with FIG. 1 and FIG. 4. Framework 100 is accessed over a network, for example, Internet, intranet, Xtranet, and so forth. In an embodiment of the invention, the first set of users accesses framework 100 through the Internet using secured Hypertext Transfer Protocols (HTTPs). Further, the second set of users accesses framework 100 through intranet, Xtranet (Xnet) or Virtual Private Network (VPN). Furthermore, at 602, the first set of users and the second set of users are authenticated and authorized for accessing framework 100. Each of the first and the second set of users are provided proper authorization for accessing framework 100 and information and transition plans stored in framework 100. The authentication and authorization of the first and the second set of users has been explained in conjunction with FIG. 1. It will be evident to a person skilled in the art that providing the access to framework 100, the authentication and the authorization of the first and the second set of users can be performed prior to the generation of the transition plans. Further, at 602, information corresponding to the first and the second set of users is displayed based on the accessing of framework 100, as explained in conjunction with FIG. 1. The information corresponding to a user or the user-specific information includes, but is not limited to, personal details, user group, tasks assigned, issues and risks assigned, and so forth.

Furthermore, at 602, one or more transition plans are generated on the basis of one or more work streams. The one or more work streams include, but are not limited to, domain knowledge, process integration, organization transition planning, contract management, engagement staffing, logistics, infrastructure, and application transition. The generation of the transition plans based on the one or more work streams has been explained in conjunction with FIG. 2. The one or more transition plans generated on the basis of one or more work streams are also stored and managed at 602, as explained in conjunction with FIG. 2. The transition plans based on the work streams are managed by a user, for example, a transition manager. Also, at 602, information corresponding to the one or more work streams is stored and managed, as explained in conjunction with FIG. 2. The information corresponding to the one or more work streams includes the information required for the implementation of the transition plans, for example, details of assets such as computers, desks, and so forth; and details of people involved in the transition process, and so forth. A user, for example, a transition manager manages the information corresponding to the one or more work streams.

Subsequently, at 602, cost of the transition of the one or more applications is determined and analyzed. The overall cost involved in the maintenance and support of the applications being transitioned is determined and analyzed at 602, as explained in conjunction with FIG. 2.

At 604, a plurality of knowledge elements corresponding to the one or more applications is captured. Knowledge elements include business, system and testing knowledge related to the applications, for example, program elements or source code, use-cases, test cases, support processes, incident resolution, and so forth. Further, the knowledge elements also correspond to the one or more transition activities of the transition plans. The knowledge elements are captured using at least one of one or more knowledge capturing tools and one or more predefined knowledge reference components. Examples of the knowledge capturing tools include Influx® developed by Infosys®, Rational® TestManager developed by IBM®, Enterprise View™ developed by Micro Focus®, Intelligent Production Support Platform (IPSP) developed by Infosys®, Service Level Agreement developed by Oblicore™, and so forth. Further, the predefined knowledge reference components include templates, forms, and so forth used for capturing the knowledge elements. The capturing of the knowledge elements using at least one of the knowledge capturing tools and the predefined knowledge reference elements has been explained in conjunction with FIG. 1 and FIG. 3. Further, at 604, the plurality of knowledge elements and the information corresponding to the one or more applications is stored, as explained in conjunction with FIG. 1 and FIG. 3. Furthermore, at 604, the information corresponding to the one or more applications is extracted from the first set of users. The information corresponding to the one or more applications is extracted using one or more knowledge capturing tools, as explained in conjunction with FIG. 3.

At 606, the plurality of knowledge elements is associated with each other as explained in conjunction with FIG. 1 and FIG. 3. The association between the plurality of knowledge elements is established by the first set of users and the second set of users.

At 608, the plurality of knowledge elements and the association between the plurality of knowledge elements is validated. The validation of the knowledge elements and their association is performed based on a predefined set of rules, as explained in conjunction with FIG. 1.

At 610, collaboration between the first set of users and the second set of users is provided or established. The collaboration thus established enables communication between the first set of users and the second set of users during the transition of the one or more applications. The first and the second set of users can communicate in a synchronous and an asynchronous manner. The collaboration is enabled through joint document creation, managing knowledge, workflows, sharing of knowledge transfer recording sessions, instant messaging between the first and the second set of users, and participation in discussion forums. The collaboration between the first and the second set of users has been explained in conjunction with FIG. 1 and FIG. 4.

At 610, one or more collaboration tools are provided to enable communication between the first and the second set of users. The one or more collaboration tools include, but are not limited to, live session recorders, screen capturing tools, wikis, blogs, RSS feeds and reviews, and discussion forums. The communication between the first and the second set of users using the one or more collaboration tools has been explained in conjunction with FIG. 4.

At 610, the plurality of knowledge elements is managed by a user, for example, a transition manager. The management of the knowledge elements includes managing one or more versions of the knowledge elements, as explained in conjunction with FIG. 4. Further, a historical log of changes or modifications made to the knowledge elements and other information sources is maintained and managed at 610. Further, workflow features such as document workflow, and so forth are provided at 610. The different workflow features have been explained in conjunction with FIG. 4. Furthermore, at 610, the one or more transition activities or tasks are managed by a user, for example, a transition manager, as explained in conjunction with FIG. 4, FIG. 7(a) and FIG. 7(b).

At 610, the status of the transition of the one or more applications is monitored by a user such as the first set of users, the second set of users, and so forth. The status of the transition is monitored using one or more features such as task management, dashboard, and so forth, as explained in conjunction with FIG. 1. At 610, the status of the transition is also published for the organization, as explained in conjunction with FIG. 1. Further, one or more reports on the basis of the status of the transition are generated at 610. The reports are also generated based on the information corresponding to the one or more applications. Some examples of the reports include wave-level transition status, cluster-level transition status, contact details of the first set of users, and so forth. The reports are generated in various formats such as Microsoft Excel®, HyperText Markup Language (HTML), and so forth. The generation of the reports has been explained in conjunction with FIG. 1. It will be evident to a person skilled in the art that 610 can be interchangeably performed with 602, 604, 606 or 608.

Figure 7A:
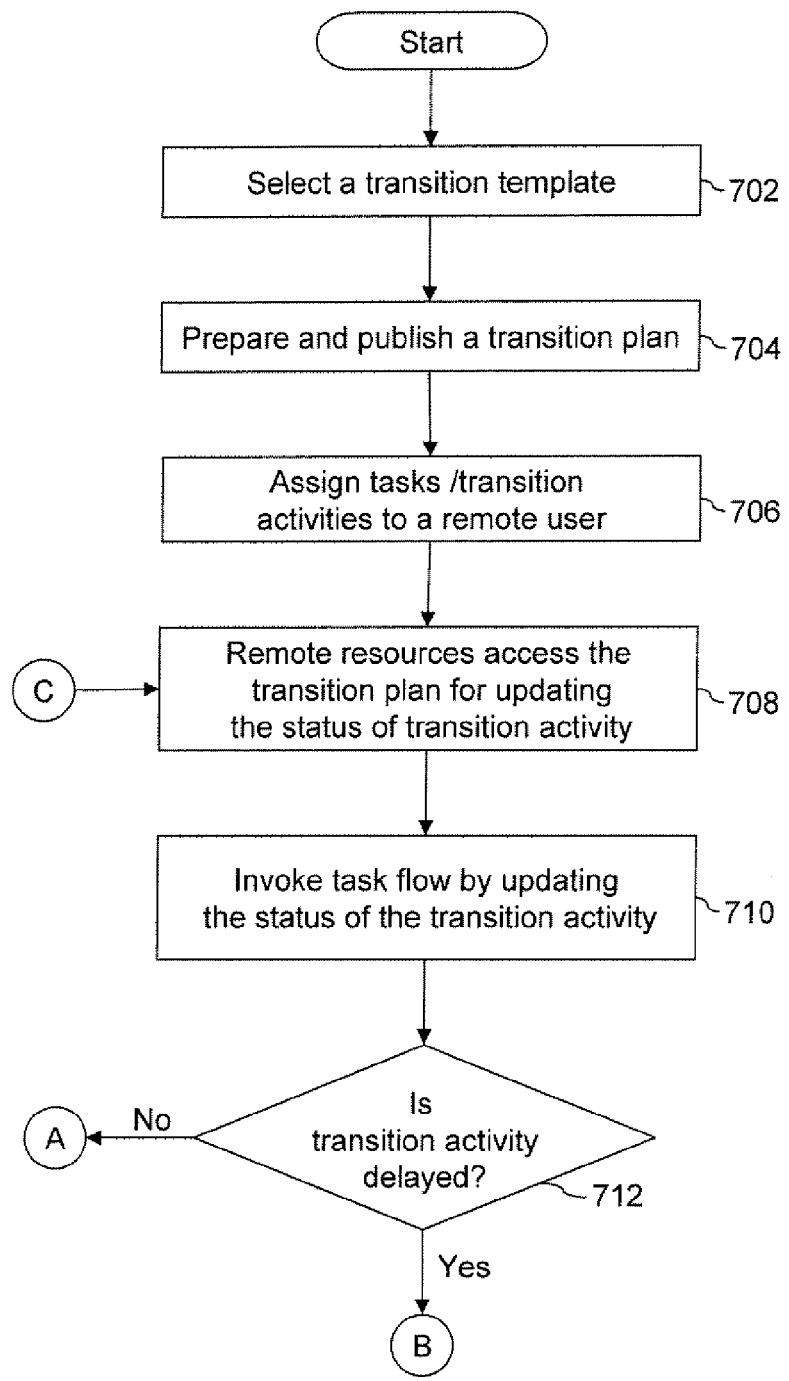
FIG. 7(a) and FIG. 7(b) depict a flowchart illustrating a method for updating of one or more transition activities in a task flow, in accordance with an embodiment of the invention.
Figure 7B:
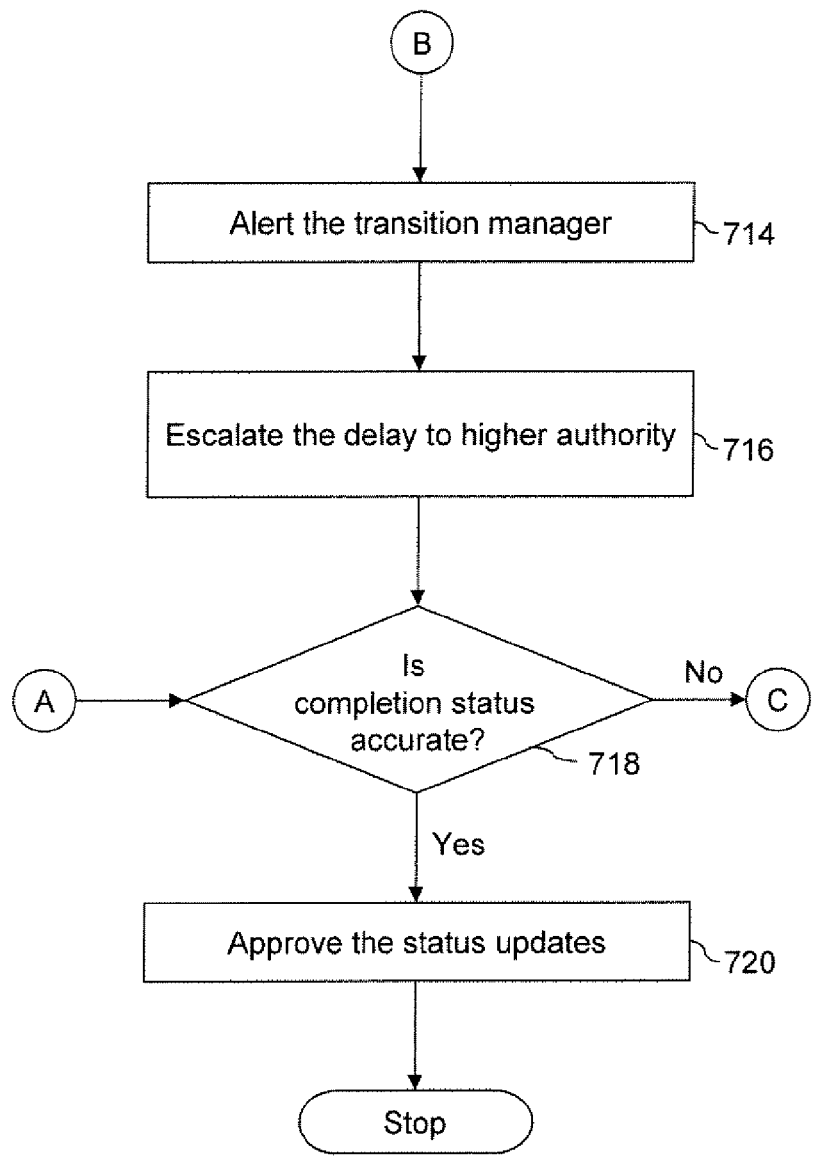

FIG. 7(a) and FIG. 7(b) depict a flowchart illustrating a method for updating of one or more transition activities in a task flow, in accordance with an embodiment of the invention. In other words, the flowchart illustrated in FIGS. 7(a) and 7(b) depicts a method for task flow tracking.

At 702, a transition template is selected by a user, for example, a transition manager on the basis of the information corresponding to the one or more applications. The transition template refers to a predefined pattern or layout which is used for generating the one or more transition plans. The template includes pre-filled information such as different transition activities to be performed and some missing information such as names and roles of the second set of users required for performing the transition activities, the timelines of performing the transition activities, and so forth. The missing information in the transition template is filled by the transition manager. The information provided by the transition manager is then used for generating the transition plans. Framework 100 generates a default transition template for capturing the information from the transition manager. In an embodiment of the invention, the transition manager customizes the transition template according to different transition scenarios. For example, the transition manager customizes the transition template in terms of the transition activities to be performed, the timelines for performing the transition activities, and so forth.

At 704, a user, for example, a transition manager, managing one or more transition activities prepares a transition plan and publishes it. Thereafter, at 706, the transition manager assigns various tasks or transition activities to different users, such as the first and the second set of users, situated at various remote locations. The tasks thus assigned to a user or transition team member are also reflected as pending tasks in the personalized dashboard of the particular user. Further at 708, transition plan is accessed by the remote users for updating the status of the transition activities assigned to them.

At 710, the task flow is invoked by updating the status of the transition activity. At 712, it is determined if the task or the transition activity is delayed or not. In case the task is delayed at 712, the transition manager is alerted at 714. If the task is not delayed, then the process moves to 718.

At 716, the delay is escalated to a higher authority. Subsequently, at 718, a check is performed to verify whether the completion status of the task or the transition activity is accurate or not. In case the completion status is accurate, the status updates of the tasks are viewed and approved by the transition manager at 720. The approved tasks are further reflected in the overall status of the transition process. In case the completion status is inaccurate, the process moves to 708.

Figure 8:
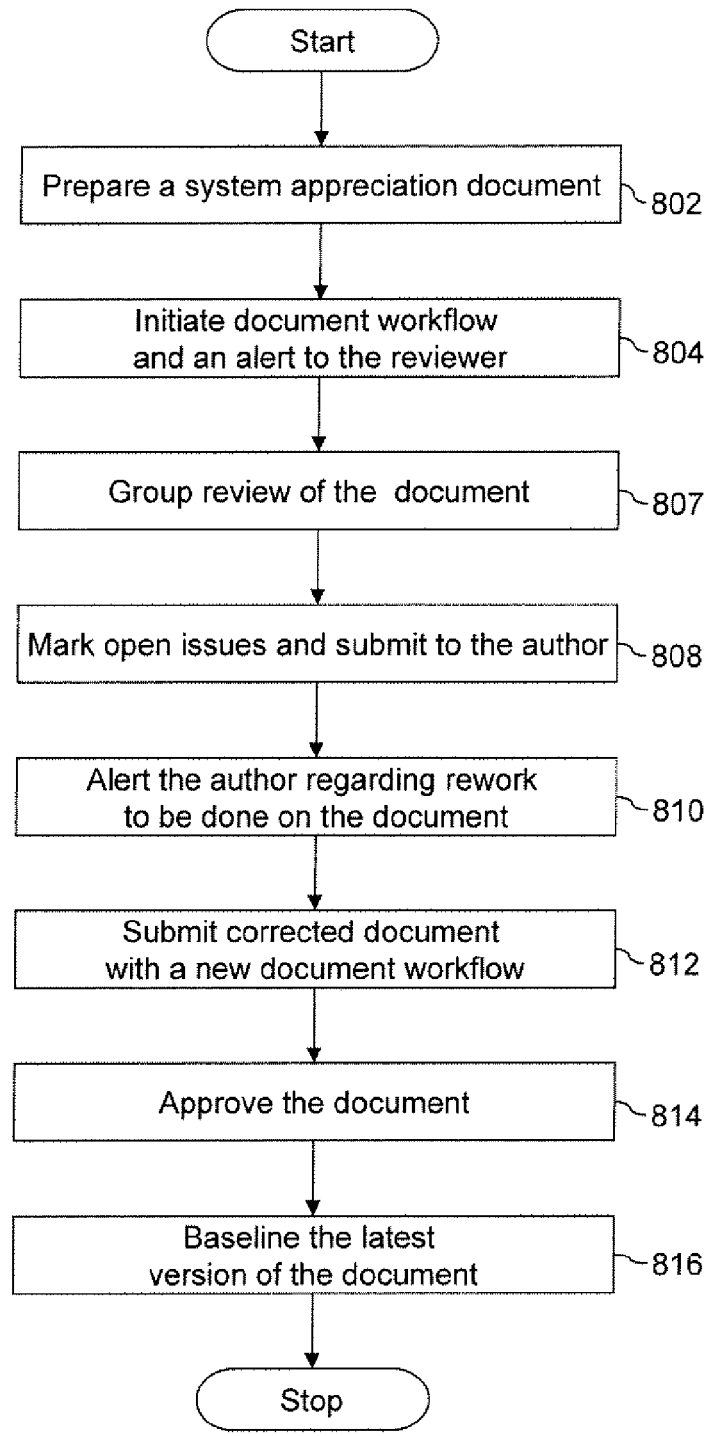
FIG. 8 is a flowchart illustrating a document review workflow, in accordance with an embodiment of the invention.

FIG. 8 is a flowchart illustrating a document review workflow, in accordance with an embodiment of the invention. In other words, the flowchart illustrated in FIG. 8 depicts a method for managing document reviews.

At 802, a system appreciation document, hereinafter referred to as document, is prepared. The document is prepared by a user, for example, a user from the second set of users. At 804, a document workflow is initiated and an alert is sent to a reviewer, for example, a user from the first set of users. An alert such as an email is sent to the reviewer about the submission of the document. Thereafter, at 806, a group review of the document is performed. In an embodiment of the invention, the document is reviewed by the first set of users and the second set of users simultaneously.

At 808, open issues and risks are marked in the document and the document is then submitted to its author, for example, a user from the second set of users. At 810, the author of the document is alerted regarding the rework to be done on the document. An alert such as email is sent to the author. Subsequently, at 812, the corrected document is submitted by the author. The author also submits a new document workflow for the corrected document. At 814, the corrected document is reviewed and approved by a user, for example, a user from the first set of users. At 816, the author of the document baselines or standardizes the latest and the corrected version of the document.

The framework described above has a number of advantages. The framework facilitates collaboration between the users involved in the transition process, thereby enabling easy management of the transition process involving a large number of users. Further, the framework improves transparency, and simplifies and automates the transition process. It also overcomes the problems of making the transition offshore centric and reduces the cost of transition and visa requirements significantly. The framework eliminates the need for the presence of a significant number of resources at the client's location(s) and enables transition to be performed at a global platform.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for supporting transition of one or more applications of an organization. The computer program product includes a computer usable medium having a set program instructions comprising a program code for supporting transition of one or more applications of an organization. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

What is claimed is:

1. A framework suitable for use in transition of one or more applications of an organization, the one or more applications being transitioned from a first set of users to a second set of users, the framework comprising:
   a. a transition module configured for generating one or more transition plans for the one or more applications, the one or more transition plans being generated based on information corresponding to the one or more applications, the one or more transition plans comprising one or more transition activities;
   b. a knowledge capture module configured for:
      i. capturing a plurality of knowledge elements corresponding to the one or more applications and the one or more transition activities, wherein the plurality of knowledge elements are captured using (1) one or more knowledge capturing tools and (2) one or more predefined knowledge reference components, and wherein the plurality of knowledge elements comprise a set of source code, a use case, and an incident resolution; and
      ii. associating each of the plurality of knowledge elements corresponding to an application being transitioned with one or more other knowledge elements corresponding to the same application, wherein the associations enable identification or search of knowledge elements corresponding to said application;
   c. a knowledge validation module configured for:
      i. securing from the second set of users responses to queries regarding the captured knowledge elements and the associations between the plurality of knowledge elements; and
      ii. enabling the first set of users to evaluate the responses received from the second set of users for assessing and validating the knowledge of the second set of users regarding the plurality of knowledge elements and the association between the plurality of knowledge elements, wherein the validation is performed based on a predefined set of rules; and
   d. a collaboration module configured for providing collaboration between the first set of users and the second set of users, wherein the collaboration enables communication between the first set of users and the second set of users during the transition of the one or more applications.

2. The framework of claim 1, wherein the transition module comprises a portfolio analysis module configured for enabling a user to analyze the information corresponding to the one or more applications, the analysis being performed based on one or more criteria, wherein the information is analyzed for generating the one or more transition plans.

3. The framework of claim 2, wherein the portfolio analysis module is further configured to enable a user for:
   a. categorizing the one or more applications into one or more clusters, the categorization being performed based on a predefined criterion; and
   b. assessing the one or more clusters, the assessment being performed based on one or more scores of the one or more applications in the corresponding clusters.

4. The framework of claim 3, wherein the portfolio analysis module is further configured for:
   a. generating a graphical representation of the one or more clusters, the graphical representation being generated based on the assessment of the one or more clusters; and
   b. enabling a user to prioritize the one or more clusters for transition sequencing, the prioritization being performed based on the assessment of the one or more clusters.

5. The framework of claim 1, wherein the transition module comprises a financial scenario module configured for determining and analyzing cost of the transition of the one or more applications.

6. The framework of claim 1, wherein the transition module comprises a work stream planning module configured for:
   a. generating the one or more transition plans based on one or more work streams, each work stream comprising a plurality of contextually related sub-processes; and
   b. storing and managing the one or more transition plans generated based on the one or more work streams, wherein the one or more transition plans are managed by a user.

7. The framework of claim 6, wherein the transition module further comprises a work stream repository module configured for storing and managing information corresponding to the one or more work streams, wherein the information corresponding to the one or more work streams is managed by a user.

8. The framework of claim 1, wherein the knowledge capture module comprises a repository module configured for storing the plurality of knowledge elements and the information corresponding to the one or more applications.

9. The framework of claim 1, wherein the knowledge capture module comprises a knowledge extraction module configured for extracting the information corresponding to the one or more applications from the first set of users.

10. The framework of claim 1, wherein the collaboration module comprises a customer access module configured for enabling the first set of users and the second set of users to access the framework, wherein the framework is accessed over a network.

11. The framework of claim 1, wherein the collaboration module comprises a collaboration tools module configured for providing one or more collaboration tools, wherein the one or more collaboration tools enable the communication between the first set of users and the second set of users.

12. The framework of claim 1, wherein the collaboration module comprises a workflow module configured for enabling a user to manage the plurality of knowledge elements, wherein managing the plurality of knowledge elements comprises maintaining a historical log for managing successive versions of one or more of the plurality of knowledge elements.

13. The framework of claim 1, wherein the collaboration module comprises a task flow module configured for enabling a user to manage the one or more transition activities.

14. The framework of claim 1 further comprising a governance module configured for:
  a. enabling a user to monitor status of the transition of the one or more applications; and
  b. publishing the status of the transition for the organization.

15. The framework of claim 14 further comprising a reports module configured for generating one or more reports based on the status of the transition and information corresponding to one or more work streams.

16. The framework of claim 1 further comprising a security module configured for:
  a. authenticating and authorizing the first set of users and the second set of users for accessing the framework; and
  b. displaying information corresponding to the first set of users and the second set of users based on the accessing of the framework.

17. The framework of claim 1, wherein the knowledge capturing tools are configured for at least analyzing source code corresponding to the one or more applications for defining application design and functionality.

18. The framework of claim 1, wherein the knowledge capture module captures one or more knowledge elements based on a predefined knowledge reference component comprising a template for one or more of the second set of users to identify information required in connection with a knowledge element.

19. The framework of claim 1 wherein the knowledge validation module determines:
  i) a support effectiveness metric representing a capability measurement of at least one individual within the second set of users to be entirely responsible for support and maintenance of an application being transitioned; and
  ii) a knowledge quotient metric representing a measurement of collective knowledge of the second set of users with respect to all aspects of the application being transitioned.

20. A method suitable for use in transition of one or more applications of an organization, the one or more applications being transitioned from a first set of users to a second set of users, the method comprising:
  a. generating one or more transition plans for the one or more applications, the one or more transition plans being generated based on information corresponding to the one or more applications, the one or more transition plans comprising one or more transition activities;
  b. capturing a plurality of knowledge elements corresponding to the one or more applications and the one or more transition activities, wherein the plurality of knowledge elements are captured using one or more knowledge capturing tools and one or more predefined knowledge reference components, and wherein the plurality of knowledge elements comprise a set of source code, a use case, and an incident resolution;
  c. associating each of the plurality of knowledge elements corresponding to a particular application with one or more other elements corresponding to said application, wherein the association between the plurality of knowledge elements is established by the first set of users and the second set of users;
  d. enabling the first set of users to assess and validate the knowledge of the plurality of knowledge elements and the association between the plurality of knowledge elements, wherein the validation is performed based on a predefined set of rules; and
  e. providing collaboration between the first set of users and the second set of users, wherein the collaboration enables communication between the first set of users and the second set of users during the transition of the one or more applications.

21. The method of claim 20 further comprising analyzing the information corresponding to the one or more applications, the analysis being performed by a user, the analysis being based on one or more criteria, wherein the information is analyzed for generating the one or more transition plans.

22. The method of claim 20 further comprising:
  a. categorizing the one or more applications into one or more clusters, the categorization being performed based on a predefined criterion; and
  b. assessing the one or more clusters, the assessment being performed based on one or more scores of the one or more applications in the corresponding clusters.

23. The method of claim 22 further comprising:
  a. generating a graphical representation of the one or more clusters, the graphical representation being generated based on the assessment of the one or more clusters; and
  b. prioritizing the one or more clusters for transition sequencing, the prioritization being performed based on the assessment of the one or more clusters, wherein the one or more clusters are prioritized by a user.

24. The method of claim 20 further comprising determining and analyzing cost of the transition of the one or more applications.

25. The method of claim 20 further comprising:
  a. generating one or more transition plans based on one or more work streams;
  b. storing and managing the one or more transition plans generated based on the one or more work streams, wherein the one or more transition plans are managed by a user; and c. storing and managing information corresponding to the one or more work streams, wherein the information corresponding to the one or more work streams is managed by a user.

26. The method of claim 20 further comprising storing the plurality of knowledge elements and the information corresponding to the one or more applications.

27. The method of claim 20 further comprising extracting the information corresponding to the one or more applications from the first set of users.

28. The method of claim 20 further comprising managing the plurality of knowledge elements, the plurality of knowledge elements being managed by a user, wherein managing the plurality of knowledge elements comprises managing one or more versions of the plurality of knowledge elements.

29. The method of claim 20 further comprising managing the one or more transition activities, wherein the one or more transition activities are managed by a user.

30. The method of claim 20 further comprising:
  a. monitoring status of the transition of the one or more applications, wherein the status is monitored by a user;
  b. publishing the status of the transition for the organization; and
  c. generating one or more reports based on the status of the transition and information corresponding to one or more work streams.

31. The method of claim 20 further comprising:
  a. authenticating and authorizing the first set of users and the second set of users for accessing the framework; and
  b. displaying information corresponding to the first set of users and the second set of users based on the accessing of the framework.

32. The method of claim 20, wherein capturing the plurality of knowledge elements using one or more knowledge capturing tools comprises at least analyzing source code corresponding to the one or more applications for defining application design and functionality.

33. The method of claim 20, wherein the one or more knowledge elements are captured based on a predefined knowledge reference component comprising a template for one or more of the second set of users to identify information required in connection with a knowledge element.

34. The method of claim 20 further comprising determining:
  i) a support effectiveness metric representing a capability measurement of at least one individual within the second set of users to be entirely responsible for support and maintenance of an application being transitioned; and
  ii) a knowledge quotient metric representing a measurement of collective knowledge of the second set of users with respect to all aspects of the application being transitioned.

35. A computer program product for use with a computer, the computer program product comprising a non-transitory computer usable medium having a computer readable program code embodied therein suitable for use in transition of one or more applications of an organization, the one or more applications being transitioned from a first set of users to a second set of users, the computer readable program code performing:
  a. generating one or more transition plans for the one or more applications, the one or more transition plans being generated based on information corresponding to the one or more applications, the one or more transition plans comprising one or more transition activities;
  b. capturing a plurality of knowledge elements corresponding to the one or more applications and the one or more transition activities, wherein the plurality of knowledge elements are captured using one or more knowledge capturing tools and one or more predefined knowledge reference components, and wherein the plurality of knowledge elements comprise a set of source code, a use case, a test case, and an incident resolution;
  c. associating each of the plurality of knowledge elements corresponding to a particular application with one or more other elements corresponding to said application, wherein the association between the plurality of knowledge elements is established by the first set of users and the second set of users;
  d. enabling the first set of users to validate the knowledge of the second set of users regarding the plurality of knowledge elements and association between the plurality of knowledge elements, wherein the validation is performed based on a predefined set of rules; and
  e. providing collaboration between the first set of users and the second set of users, wherein the collaboration enables communication between the first set of users and the second set of users during the transition of the one or more applications.

36. The computer program product of claim 35 further performing:
  a. generating the one or more transition plans based on one or more work streams;
  b. storing the one or more transition plans generated based on the one or more work streams; and
  c. storing information corresponding to the one or more work streams.

37. The computer program product of claim 35 further performing storing the plurality of knowledge elements and the information corresponding to the one or more applications.

38. The computer program product of claim 35 further performing extracting the information corresponding to the one or more applications from the first set of users.

39. The computer program product of claim 35 further performing providing an access to the first set of users and the second set of users to access the framework, wherein the framework is accessed over a network.

40. The computer program product of claim 35 further performing:
  a. publishing status of the transition for the organization; and
  b. generating one or more reports based on the status of the transition and information corresponding to one or more work streams.

41. The computer program product of claim 35 further performing:
  a. authenticating and authorizing the first set of users; and
  b. the second set of users for accessing the framework; and
  displaying information corresponding to the first set of users and the second set of users based on the accessing of the framework.

42. The computer program product of claim 35, wherein the one or more knowledge elements are captured based on a predefined knowledge reference component comprising a template for one or more of the second set of users to identify information required in connection with a knowledge element.

43. The computer program product of claim 35, wherein the computer readable program code determines:
  i) a support effectiveness metric representing a capability measurement of at least one individual within the second set of users to be entirely responsible for support and maintenance of an application being transitioned; and ii) a knowledge quotient metric representing a measurement of collective knowledge of the second set of users with respect to all aspects of the application being transitioned.

44. A framework suitable for use in transition of one or more applications of an organization, the one or more applications being transitioned from a first set of users to a second set of users, the framework comprising:
   a. a transition module configured for generating one or more transition plans for the one or more applications, the one or more transition plans being generated based on information corresponding to the one or more applications, the one or more transition plans comprising one or more transition activities, wherein the transition module comprises a work stream planning module configured for:
      i. generating the one or more transition plans based on one or more work streams, each work stream comprising a plurality of contextually related sub-processes; and
      ii. storing and managing the one or more transition plans generated based on the one or more work streams, wherein the one or more transition plans are managed by a user;
   b. a knowledge capture module configured for:
      i. capturing a plurality of knowledge elements corresponding to the one or more applications and the one or more transition activities, wherein the plurality of knowledge elements are captured using at least one of (1) one or more knowledge capturing tools and (2) one or more predefined knowledge reference components, and wherein the plurality of knowledge elements comprise at least one of a set of source code, a use case, a test case, a support process, an incident resolution, a user manual, or a training material; and
      ii. associating each of the plurality of knowledge elements corresponding to an application being transitioned with one or more other knowledge elements corresponding to the same application, wherein the associations enable identification or search of knowledge elements corresponding to said application;
   c. a knowledge validation module configured for:
      i. securing from the second set of users responses to queries regarding the captured knowledge elements and the associations between the plurality of knowledge elements; and
      ii. enabling the first set of users to evaluate the responses received from the second set of users for assessing and validating the knowledge of the second set of users regarding the plurality of knowledge elements and the association between the plurality of knowledge elements, wherein the validation is performed based on a predefined set of rules; and
   d. a collaboration module configured for providing collaboration between the first set of users and the second set of users, wherein the collaboration enables communication between the first set of users and the second set of users during the transition of the one or more applications.

45. A method suitable for use in transition of one or more applications of an organization, the one or more applications being transitioned from a first set of users to a second set of users, the method comprising:
   a. generating one or more transition plans for the one or more applications, the one or more transition plans being generated based on information corresponding to the one or more applications, the one or more transition plans comprising one or more transition activities;
   b. capturing a plurality of knowledge elements corresponding to the one or more applications and the one or more transition activities, wherein the plurality of knowledge elements are captured using at least one of one or more knowledge capturing tools and one or more predefined knowledge reference components, and wherein the plurality of knowledge elements comprise at least one of a set of source code, a use case, a test case, a support process, an incident resolution, a user manual, or a training material;
   c. associating each of the plurality of knowledge elements corresponding to a particular application with one or more other elements corresponding to said application, wherein the association between the plurality of knowledge elements is established by the first set of users and the second set of users;
   d. enabling the first set of users to assess and validate the knowledge of the plurality of knowledge elements and the association between the plurality of knowledge elements, wherein the validation is performed based on a predefined set of rules;
   e. providing collaboration between the first set of users and the second set of users, wherein the collaboration enables communication between the first set of users and the second set of users during the transition of the one or more applications;
   f. generating one or more transition plans based on one or more work streams;
   g. storing and managing the one or more transition plans generated based on the one or more work streams, wherein the one or more transition plans are managed by a user; and
   h. storing and managing information corresponding to the one or more work streams, wherein the information corresponding to the one or more work streams is managed by a user.

46. A computer program product for use with a computer, the computer program product comprising a non-transitory computer usable medium having a computer readable program code embodied therein suitable for use in transition of one or more applications of an organization, the one or more applications being transitioned from a first set of users to a second set of users, the computer readable program code performing:
   a. generating one or more transition plans for the one or more applications, the one or more transition plans being generated based on information corresponding to the one or more applications, the one or more transition plans comprising one or more transition activities;
   b. capturing a plurality of knowledge elements corresponding to the one or more applications and the one or more transition activities, wherein the plurality of knowledge elements are captured using at least one of one or more knowledge capturing tools and one or more predefined knowledge reference components, and wherein the plurality of knowledge elements comprise at least one of a set of source code, a use case, a test case, a support process, an incident resolution, a user manual, or a training material;
   c. associating each of the plurality of knowledge elements corresponding to a particular application with one or more other elements corresponding to said application, wherein the association between the plurality of knowledge elements is established by the first set of users and the second set of users;
   d. enabling the first set of users to validate the knowledge of the second set of users regarding the plurality of knowledge elements and association between the plurality of knowledge elements, wherein the validation is performed based on a predefined set of rules; and e. providing collaboration between the first set of users and the second set of users, wherein the collaboration enables communication between the first set of users and the second set of users during the transition of the one or more applications;

f. generating the one or more transition plans based on one or more work streams;

g. storing the one or more transition plans generated based on the one or more work streams; and h. storing information corresponding to the one or more work streams.

* * * * *